United States Patent
Moon et al.

(10) Patent No.: US 11,368,275 B2
(45) Date of Patent: Jun. 21, 2022

(54) METHOD FOR CONFIGURING BANDWIDTH FOR SUPPORTING BROADBAND CARRIER IN COMMUNICATION SYSTEM

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR); Jun Hwan Lee, Seoul (KR); Min Hyun Kim, Busan (KR); Ji Hyung Kim, Daejeon (KR); Ju Ho Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 195 days.

(21) Appl. No.: 16/620,809

(22) PCT Filed: Jun. 14, 2018

(86) PCT No.: PCT/KR2018/006712
§ 371 (c)(1),
(2) Date: Jun. 26, 2020

(87) PCT Pub. No.: WO2018/230965
PCT Pub. Date: Dec. 20, 2018

(65) Prior Publication Data
US 2020/0344034 A1    Oct. 29, 2020

(30) Foreign Application Priority Data

Jun. 16, 2017  (KR) .................. 10-2017-0076915
Jun. 30, 2017  (KR) .................. 10-2017-0083762
(Continued)

(51) Int. Cl.
*H04L 5/10*         (2006.01)
*H04L 5/00*         (2006.01)
(Continued)

(52) U.S. Cl.
CPC .............. *H04L 5/10* (2013.01); *H04L 5/0051* (2013.01); *H04L 5/0092* (2013.01);
(Continued)

(58) Field of Classification Search
CPC ....... H04L 5/10; H04L 5/0051; H04L 5/0092; H04L 5/0094; H04W 56/001;
(Continued)

(56) References Cited

U.S. PATENT DOCUMENTS 7,680,156 B2   3/2010   Jung et al.
9,031,015 B2   5/2015   Pan et al.
(Continued)

FOREIGN PATENT DOCUMENTS

| KR | 10-1639757 B1 | 7/2016 |
| WO | 2010/019679 A2 | 2/2010 |
| WO | 2012/148236 A2 | 11/2012 |

OTHER PUBLICATIONS

Ericsson, "On Mixed Numerology", R1-1709094, 3GPP TSG-RAN WG1 #89, Hangzhou, China, May 7, 2017.
(Continued)

*Primary Examiner* — Candal Elpenord
(74) *Attorney, Agent, or Firm* — Rabin & Berdo, P.C.

(57) ABSTRACT

Disclosed is a method for configuring a bandwidth for supporting a broadband carrier in a communication system.
(Continued)

An operation method of a base station comprises the steps of: configuring a first bandwidth part and a second bandwidth part for a terminal; configuring a reserved resource for the first bandwidth part in a resource area in which the first bandwidth part and the second bandwidth part overlap; and performing an operation of transmitting or receiving a second data channel, which is scheduled to the second bandwidth part, together with the terminal by using the reserved resource. Therefore, the performance of the communication system can be improved.

18 Claims, 18 Drawing Sheets

(30) Foreign Application Priority Data

| Aug. 21, 2017 | (KR) | 10-2017-0105744 |
|---|---|---|
| Jan. 19, 2018 | (KR) | 10-2018-0007112 |
| Feb. 2, 2018 | (KR) | 10-2018-0013634 |
| Feb. 14, 2018 | (KR) | 10-2018-0018709 |

(51) Int. Cl.
*H04W 72/04* (2009.01)
*H04W 72/12* (2009.01)
*H04W 76/11* (2018.01)
*H04W 72/02* (2009.01)
*H04W 56/00* (2009.01)

(52) U.S. Cl.
CPC ......... *H04L 5/0094* (2013.01); *H04W 56/001* (2013.01); *H04W 72/02* (2013.01); *H04W 72/042* (2013.01); *H04W 72/1263* (2013.01); *H04W 76/11* (2018.02)

(58) Field of Classification Search
CPC ... H04W 76/11; H04W 72/02; H04W 72/042; H04W 72/1263; H04W 72/04
USPC .................................................. 370/329–330
See application file for complete search history.

(56) References Cited

U.S. PATENT DOCUMENTS

| 2013/0294368 | A1* | 11/2013 | Bendlin | H04L 5/0053 370/329 |
|---|---|---|---|---|
| 2014/0185578 | A1* | 7/2014 | Park | H04L 1/0038 370/329 |
| 2014/0301346 | A1* | 10/2014 | Seo | H04L 5/0048 370/329 |
| 2014/0321422 | A1* | 10/2014 | Choi | H04L 5/0055 370/330 |
| 2015/0289288 | A1 | 10/2015 | Jung et al. | |
| 2016/0006548 | A1* | 1/2016 | Yang | H04L 5/0094 370/329 |
| 2016/0050647 | A1* | 2/2016 | Hwang | H04W 52/04 370/329 |
| 2016/0135147 | A1* | 5/2016 | Ouchi | H04W 72/042 370/329 |
| 2016/0380732 | A1* | 12/2016 | Chung | H04J 11/0079 370/329 |
| 2017/0196019 | A1 | 7/2017 | Kim et al. | |
| 2018/0375636 | A1* | 12/2018 | You | H04L 5/001 |
| 2020/0021410 | A1* | 1/2020 | Choi | H04L 5/0051 |
| 2021/0127358 | A1* | 4/2021 | Li | H04J 11/0069 |

OTHER PUBLICATIONS

Huawei et al., "Numerology for Multiplexing of eMBB and URLLC", R1-1706914, 3GPP TSG RAN WG1 Meeting #89, Hangzhou, China, May 6, 2017.
Intel Corporation, "Bandwidth Parts Configuration and Operations", R1-1707420, 3GPP TSG RAN WG1 Meeting #89, Hangzhou, China, May 7, 2017.
Intel Corporation, "eMBB/URLLC Multiplexing for DL", R1-1704763, 3GPP TSG RAN1 WG Meeting #88bis, Spokane, USA, Mar. 25, 2017.
Huawei et al., "On bandwidth part and bandwidth adaptation",R1-1706900, 3GPP TSG RAN WG1 Meeting #89, Hangzhou, China, May 15-19, 2017.
NEC, "PDCCH structure for NR", R1-1707199, 3GPP TSG-RAN WG1 Meeting #89, Hangzhou, P.R. China, May 15-19, 2017.
Samsung, "DMRS structure for NR-PDCCH", R1-1707986, 3GPP TSG RAN WG1 Meeting #89, Hangzhou, China, May 15-19, 2017.
Samsung, "Resource Mapping for NR-PDCCH", R1-1707985, 3GPP TSG RAN WG1 Meeting #89, Hangzhou, China, May 15-19, 2017.

* cited by examiner

METHOD FOR CONFIGURING BANDWIDTH FOR SUPPORTING BROADBAND CARRIER IN COMMUNICATION SYSTEM

TECHNICAL FIELD

The present invention relates to a technique for configuring a bandwidth part in a communication system, and more particularly, to a technique for configuring a bandwidth part to support initial access in a wideband carrier.

BACKGROUND ART

A communication system (e.g., a new radio (NR)) using a higher frequency band (e.g., a frequency band of 6 GHz or higher) than a frequency band (e.g., a frequency band of 6 GHz or lower) of a long term evolution (LTE) based communication system (or, a LTE-A based communication system) is being considered for processing of soaring wireless data. The NR can support not only a frequency band above 6 GHz but also a frequency band below 6 GHz, and can support various communication services and scenarios compared to the LTE. Further, the requirements of the NR may include enhanced mobile broadband (eMBB), ultra reliable low latency communication (URLLC), massive machine type communication (mMTC), and the like.

Meanwhile, one or more bandwidth parts may be configured in a wideband carrier in the NR. However, a method for configuring a bandwidth part supporting initial access in the wideband carrier, an initial access procedure in the configured bandwidth part, and the like are not clearly defined. Also, when a plurality of bandwidth parts are configured in a terminal, and there is an overlapped resource region between the plurality of bandwidth parts, it is not clearly defined which associated channel and signal are transmitted through which bandwidth part in the overlapped resource region. Therefore, operations of a base station and a terminal need to be clearly defined in the bandwidth part.

DISCLOSURE

Technical Problem

The objective of the present invention to solve the above-described problem is to provide a method of configuring a bandwidth part of a terminal for supporting an initial access in a communication system.

Technical Solution

An operation method of a base station in a communication system, according to a first embodiment of the present invention for achieving the above-described objective, may comprise configuring a first bandwidth part and a second bandwidth part for a terminal; configuring reserved resources for the first bandwidth part in a resource region overlapped between the first bandwidth part and the second bandwidth part; and performing a transceiving operation of a second data channel scheduled in the second bandwidth part with the terminal using the reserved resources.

Here, the operation method may further comprise performing a transceiving operation of a first data channel scheduled in the first bandwidth part with the terminal using a time-frequency resource excluding the reserved resources in the first bandwidth part.

Here, the first data channel may be rate-matched around the reserved resources.

Here, both the first bandwidth part and the second bandwidth part may be activated.

Here, the first bandwidth part and the second bandwidth part may belong to the same carrier configured in the terminal.

Here, each of the first bandwidth part and the second bandwidth part may belong to a different carrier configured in the terminal.

Here, the reserved resources may be configured in the first bandwidth part according to a numerology of the first bandwidth part.

Here, the configuration information of the reserved resources may be transmitted to the terminal through a higher layer signaling procedure or a physical layer signaling procedure.

Here, the first bandwidth part and the second bandwidth part may be downlink bandwidth parts, and the second data channel may be a physical downlink shared channel (PDSCH).

An operation method of a terminal in a communication system, according to a second embodiment of the present invention for achieving the above-described objective, may comprise receiving configuration information of a first bandwidth part and configuration information of a second bandwidth part from a base station; receiving configuration information of reserved resources for the first bandwidth part in a resource region overlapped between the first bandwidth part and the second bandwidth part; and performing a transceiving operation of a second data channel scheduled in the second bandwidth part with the base station using the reserved resources.

Here, the operation method may further comprise performing a transceiving operation of a first data channel scheduled in the first bandwidth part with the base station using a time-frequency resource excluding the reserved resources in the first bandwidth part.

Here, the first data channel may be rate-matched around the reserved resources.

Here, both the first bandwidth part and the second bandwidth part may be activated.

Here, the first bandwidth part and the second bandwidth part may belong to the same carrier configured in the terminal.

Here, each of the first bandwidth part and the second bandwidth part may belong to a different carrier configured in the terminal.

Here, the reserved resources may be configured in the first bandwidth part according to a numerology of the first bandwidth part.

Here, the configuration information of the reserved resources may be received from the base station through a higher layer signaling procedure or a physical layer signaling procedure.

Here, the first bandwidth part and the second bandwidth part may be downlink bandwidth parts, and the second data channel may be a physical downlink shared channel (PDSCH).

An operation method of a terminal in a communication system, according to a third embodiment of the present invention for achieving the above-described objective, may comprise receiving configuration information indicating a semi-static slot format from a base station; identifying a reference subcarrier spacing of the semi-static slot format based on the configuration information; and determining that a subcarrier spacing of a bandwidth part of the terminal is greater than or equal to the reference subcarrier spacing.

Here, the method may further comprise configuring a type of a first symbol in the bandwidth part to be equal to a type of a second symbol in accordance with the semi-static slot format located at a same time point as the first symbol.

Advantageous Effects

In accordance with the present invention, a plurality of bandwidth parts (e.g., a first bandwidth part, a second bandwidth part) may be configured in a terminal, and reserved resources for the first bandwidth part may be configured in an overlapped resource region between the first bandwidth part and the second bandwidth part. The enhanced mobile broadband (eMBB) data can be transmitted or received through a time-frequency resource other than the reserved resources in the overlapped resource region within the first bandwidth part, and the ultra-reliable low-latency communication (URLLC) data can be transmitted or received through the reserved resources. That is, when the reserved resources are configured, high-reliability and low-latency requirements in the NR can be satisfied.

In addition, when a semi-static slot format is used, a reference subcarrier spacing of the semi-static slot format may be set to the smallest subcarrier spacing candidate among subcarrier spacing candidates available for the bandwidth part. In this case, a problem that one symbol of the bandwidth part is mapped to symbols having different transmission directions according to the semi-static slot format can be solved. Alternatively, when the reference subcarrier spacing of the semi-static slot format is greater than the subcarrier spacing of the bandwidth part, one symbol of the bandwidth part may be mapped to symbols having different transmission directions according to the semi-static slot format. In this case, the transmission direction of the one symbol of the bandwidth part may be determined according to a predetermined rule. Therefore, the performance of the communication system can be improved.

MODES OF THE INVENTION

Figure 1:
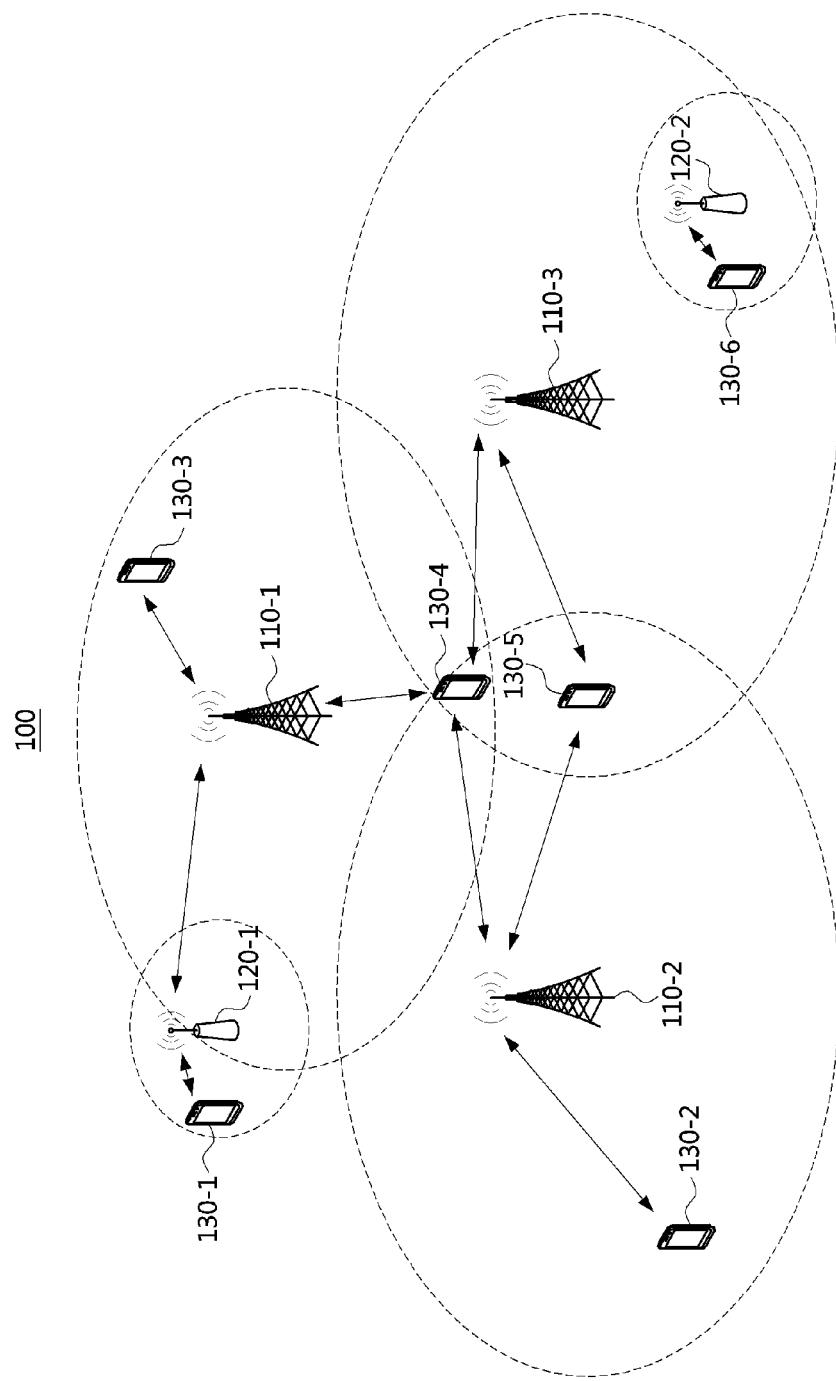
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

The communication systems to which embodiments according to the present invention are applied will be described. The communication system may be a 4G communication system (e.g., a long-term evolution (LTE) communication system, an LTE-A communication system), a 5G communication system (e.g. a new radio (NR) communication system), or the like. The 4G communication system can support communication in a frequency band of 6 GHz or less, and the 5G communication system can support communication in a frequency band of 6 GHz or less as well as a frequency band of 6 GHz or more. The communication system to which the embodiments according to the present invention are applied is not limited to the following description, and the embodiments according to the present invention can be applied to various communication systems. Here, the communication system may be used in the same sense as a communication network, 'LTE' may indicate the '4G communication system', the 'LTE communication system', or the 'LTE-A communication system', and 'NR' may indicate the '5G communication system' or the 'NR communication system'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may comprise a core network (e.g., a serving gateway (S-GW), a packet data network (PDN) gateway (P-GW), a mobility management entity (MME), and the like). When the communication system 100 is a 5G communication system (e.g., a new radio (NR) system), the core network may include an access and mobility management function (AMF), a user plane function (UPF), a session management function (SMF), and the like.

The plurality of communication nodes 110 to 130 may support a communication protocol (e.g., long term evolution (LTE) communication protocol, LTE-advanced (LTE-A) communication protocol, NR communication protocol) defined in the 3rd generation partnership project (3GPP) standard. The plurality of communication nodes 110 to 130 may support at least one communication protocol among a code division multiple access (CDMA) technology, a wideband CDMA (WCDMA) technology, a time division multiple access (TDMA) technology, a frequency division multiple access (FDMA) technology, an orthogonal frequency division multiplexing (OFDM) technology, a filtered OFDM technology, a cyclic prefix (CP)-OFDM technology, a discrete Fourier transform-spread-OFDM (DFT-s-OFDM) technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter band multi-carrier (FBMC) technology, an universal filtered multi-carrier (UFMC) technology, a space division multiple access (SDMA) technology, and the like. Each of the plurality of communication nodes may have the following structure.

Figure 2:
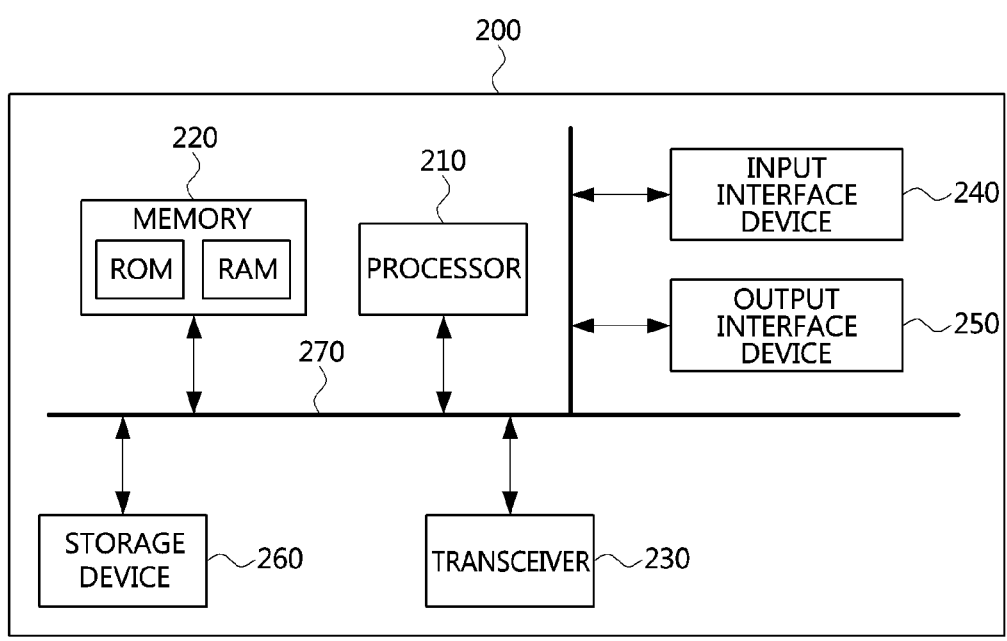
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 comprising the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may be referred to as a Node B (NodeB), an evolved Node B (eNodeB), a gNB, an advanced base station (ABS), a high reliability-base station (HR-BS), a base transceiver station (BTS), a radio base station, a radio transceiver, an access point (AP)), an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may be referred to as a user equipment (UE), a terminal equipment (TE), an advanced mobile station (AMS), a high reliability-mobile station (HR-MS), a terminal, a access terminal, a mobile terminal, a station, a subscriber station, a mobile station, a portable subscriber station, a node, a device, a mounted module, an on board unit (OBU), or the like.

Meanwhile, each of the plurality of base stations 110-1, 110-2, 110-3, 120-1, and 120-2 may operate in the same frequency band or in different frequency bands.

The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in order to efficiently use a wide frequency band in a communication system, a system bandwidth supported by the NR may be wider than a system bandwidth supported by the LTE. For example, the maximum system bandwidth supported by the LTE may be 20 MHz, and the maximum system bandwidth supported by the NR may be 400 MHz. Also, the minimum system bandwidth supported by the LTE may be 1.4 MHz. On the other hand, the minimum system bandwidth supported by the NR in the frequency band below 6 GHz may be 5 MHz, and the minimum system bandwidth supported by the NR in the frequency band above 6 GHz may be 50 MHz.

Unlike the LTE, the NR may support various bandwidth capabilities of terminal. In the LTE, a normal terminal excluding a machine type communication (MTC) terminal can support the maximum system bandwidth of 20 MHz. On the other hand, the maximum system bandwidth of 400 MHz in the NR can be supported by some terminals. For example, the maximum system bandwidth that can be supported by a specific terminal may be 20 MHz, and the maximum system bandwidth that can be supported by other terminals may be 100 MHz. However, the minimum system bandwidth in the NR may be defined commonly in all terminals. For example, the minimum system bandwidth of the NR applied to all terminals in the frequency band below 6 GHz may be 20 MHz. The bandwidth capability may be defined according to the system bandwidth. Alternatively, the bandwidth capability may be defined according to factors (e.g., fast Fourier transform (FFT) size, number of subcarriers, etc.) other than the system bandwidth.

Therefore, terminals with various bandwidth capabilities may operate in the same wideband carrier. In this case, a terminal with a bandwidth capability that can operate in an entire bandwidth (e.g., system bandwidth) of a wideband carrier by a single carrier operation without carrier aggregation may be referred to as a 'wideband terminal'. A terminal with a bandwidth capability that can operate only in a partial bandwidth of a wideband carrier by a single carrier operation may be referred to as a 'narrowband terminal'. Further, when a partial frequency region of a wideband carrier is used as an independent carrier, the independent carrier may be referred to as a 'narrowband carrier', which is relative to the wideband carrier.

For example, a carrier with a system bandwidth of 100 MHz may be present, and 5 carriers with a system bandwidth of 20 MHz within the bandwidth of 100 MHz may exist without overlapping system bandwidth. In this case, the carrier having the system bandwidth of 100 MHz may be referred to as the 'wideband carrier', and the carrier having the system bandwidth of 20 MHz may be referred to as the 'narrowband carrier'. Also, since the narrowband carrier is a partial frequency region within the wideband carrier, the narrow band carrier may be referred to as a 'wideband-sub carrier'.

In order to support both the wideband terminal and the narrowband terminal in a wideband carrier, a bandwidth part may be used. The bandwidth part may be defined as a set of consecutive physical resource blocks (PRBs) in the frequency domain, and at least one numerology (e.g., subcarrier spacing and cyclic prefix (CP) length) may be used for transmission of control channels or data channels within a bandwidth part.

The base station may configure one or more terminal-specific (UE-specific) bandwidth parts, and may inform a terminal of configuration information of the one or more UE-specific bandwidth parts through a signaling procedure. In the following embodiments, the signaling procedure may mean at least one of a higher layer signaling procedure (e.g., a radio resource control (RRC) signaling procedure) and a physical layer signaling procedure (e.g., a downlink control information (DCI) signaling procedure). The terminal may perform transmission and reception of a data channel (e.g., physical downlink shared channel (PDSCH) reception or physical uplink shared channel (PUSCH) transmission) by using a PRB or a resource block group (RBG) in the bandwidth part configured by the base station as a resource allocation unit of the frequency domain.

The RBG may be used for a bitmap-based frequency domain resource allocation scheme (e.g., type 0 resource allocation scheme of the NR), and whether or not a resource is allocated for each RBG may be indicated through each bit of the bitmap. One RBG may be composed of one or more PRBs consecutive in the frequency domain, and the number of PRBs per RBG may be predefined in the specification. Alternatively, the base station may inform the terminal of the number of PRBs per RBG through a signaling procedure. One transport block (TB) may be transmitted within one bandwidth part. Alternatively, one TB may be allowed to be transmitted through a plurality of bandwidth parts.

The configuration information of the bandwidth part may be transmitted from the base station to the terminal through a signaling procedure. The configuration information of the bandwidth part may include a numerology (e.g., subcarrier spacing, CP length, etc.) of the bandwidth part, a location of the starting PRB of the bandwidth part, the number of PRBs of the bandwidth part, and the like. The location of the starting PRB may be represented by an RB index in a common RB grid. A maximum of 4 bandwidth parts for each of uplink and downlink may be configured for a terminal in one carrier. In a time division duplex (TDD) based communication system, a pair of bandwidth parts for uplink and downlink may be configured.

At least one bandwidth part of the bandwidth part(s) configured in the terminal may be activated. For example, one uplink bandwidth part and one downlink bandwidth part may be activated in one carrier. In the TDD-based communication system, a pair of bandwidth parts for uplink and downlink may be activated.

When a plurality of bandwidth parts are configured in one carrier, the active bandwidth part may be switched. For example, a deactivation operation of the existing active bandwidth part and an activation operation of a new bandwidth part may be performed. In a frequency division duplex (FDD) based communication system, a bandwidth part switching method may be applied to each of uplink and downlink, and in a TDD based communication system, a pair of bandwidth parts for uplink and downlink may be switched. The switching of the active bandwidth part may be performed by a higher layer signaling procedure (e.g., RRC signaling procedure).

Alternatively, the switching of the active bandwidth part may be performed dynamically by a physical layer signaling procedure (e.g., DCI signaling procedure). In this case, a 'bandwidth part indicator field' included in a DCI may indicate the index of the bandwidth part for which activation is requested. When the DCI is received from the base station and the bandwidth part indicated by the bandwidth part indicator field included in the DCI is different from the current active bandwidth part, the terminal may determine that the bandwidth part indicated by the DCI is switched to a new active bandwidth part instead of the current active bandwidth part. Here, the DCI may include scheduling information of a data channel (e.g., PDSCH or PUSCH). In this case, the data channel scheduled by the DCI may be transmitted in the bandwidth part indicated by the bandwidth part indicator field of the DCI.

Meanwhile, system information of the NR may be classified into minimum system information (MSI) and other system information (OSI). Some MSIs (e.g., master information block (MIB)) among the MSIs may be transmitted via a physical broadcast channel (PBCH), and the remaining MSIs (e.g., SIB-1, SIB-2, or the like) may be transmitted via PDSCH. In the embodiments described below, the some MSIs (e.g., MIB) may be referred to as the 'PBCH'.

The PDSCH through which the remaining MSI (RMSI) is transmitted may be scheduled by a physical downlink control channel (PDCCH) (e.g., DCI included in the PDCCH), and a cyclic redundancy check (CRC) scrambled with a system information-radio network temporary identifier (SI-RNTI) may be applied to the PDCCH. In the following embodiments, scheduling of the PDSCH by the PDCCH may mean that the DCI including the scheduling information of the PDSCH is transmitted through the PDCCH. The PBCH (e.g., MIB), RMSI, and OSI may be broadcast in the entire cell coverage of the base station. In a beamforming based communication system (e.g., a communication system that supports a millimeter wave band), the PBCH (e.g., MIB), RMSI, and OSI may be transmitted in the entire cell coverage of the base station based on a beam sweeping scheme.

In the NR, a synchronization signal (SS)/PBCH block may be composed of a primary synchronization signal (PSS), a secondary synchronization signal (SSS), and a PBCH. The SS/PBCH block may also include a demodulation reference signal (DMRS) for demodulating the PBCH. One SS/PBCH block may include one PSS (or, one PSS resource), one SSS (or, one SSS resource), and one PBCH (or, one PBCH resource), and one SS burst set (e.g., one interval of an SS burst set) may comprise a plurality of SS/PBCH blocks. For example, in a frequency band below 3 GHz, an SS burst set may comprise up to 4 SS/PBCH blocks, and in a frequency band from 3 to 6 GHz, an SS burst set may comprise up to 8 SS/PBCH blocks. In a frequency band above 6 GHz, an SS burst set may comprise up to 64 SS/PBCH blocks. A candidate resource location in which the SS/PBCH block can be transmitted may be defined in the specification, and the base station may transmit the SS/PBCH block at the candidate resource location defined in the specification. Alternatively, the base station may not transmit the SS/PBCH block at the candidate resource location defined in the specification.

In the NR, a random access procedure may be composed of 4 steps. In the first step, a terminal attempting to establish an RRC connection may transmit a physical random access channel (PRACH) (e.g., message 1 (Msg1), random access preamble) to a base station in a preconfigured resource region. In the second step, the base station receiving the PRACH may transmit a random access response (RAR) message (e.g., Msg2), which is a response to the PRACH, to the terminal within a predetermined time (e.g., RAR window). The RAR message may be transmitted through the PDSCH, and the PDSCH including the RAR message may be scheduled by the PDCCH.

In the third step, the terminal receiving the RAR message may transmit Msg3 to the base station in an uplink resource region (e.g., PUSCH) indicated by the RAR message. Msg3 may include an RRC connection request message. In the fourth step, the base station receiving Msg3 may transmit Msg4 to the terminal to resolve a collision caused by simultaneous accesses of a plurality of terminals. Msg4 may be transmitted through a PDSCH, and the PDSCH including Msg4 may be scheduled by the PDCCH.

The minimum unit of resources constituting the PDCCH in the NR may be a resource element group (REG). The REG may be composed of one PRB (e.g., 12 subcarriers) in the frequency domain and one symbol (e.g., OFDM symbol) in the time domain Thus, one REG may include 12 resource elements (REs). Within one REG, some REs may be used for transmission of the DMRS for demodulation of the PDCCH. One PDCCH candidate may be composed of one control channel element (CCE) or aggregated CCEs, and one CCE may be composed of a plurality of REGs (e.g., 6 REGs).

A control resource set (CORESET) may be a resource region on which the terminal performs blind decoding of the PDCCH. The control resource set may be composed of a plurality of REGs. The control resource set may comprise a plurality of PRBs in the frequency domain and one or more symbols (e.g., one or more OFDM symbols) in the time domain. The symbols constituting one control resource set may be continuous in the time domain, and the PRBs constituting one control resource set may be continuous or discontinuous in the frequency domain.

One or more control resource sets may be configured in one cell or one carrier. Since the NR can support a single carrier having a wider bandwidth (e.g., up to 400 MHz) than the conventional communication system, a plurality of control resource sets may be configured in one carrier. Also, one or more control resource sets may be configured for one terminal. Even when a plurality of control resource sets are configured for one terminal, one DCI may be transmitted in one control resource set. The location of the control resource set in the time domain (e.g., period during which the terminal monitors the control resource set) may be configured by the base station, and the base station may inform the terminal of the location of the control resource set in the time domain. The location of the control resource set in the time domain may be configured in various units (e.g., in unit of slot(s), in unit of symbol(s)).

The terminal may use a blind decoding scheme based on CRC to receive a PDCCH. A DCI transmitted through the PDCCH may include a common DCI common to a plurality of terminals and a terminal-specific (UE-specific) DCI for a specific terminal. For example, the common DCI or a group common DCI may include resource allocation information of system information, paging message, power control command, slot format indicator (SFI), preemption indication (PI), and the like. The UE-specific DCI may include scheduling information of an uplink data channel, scheduling information of a downlink data channel, and the like. Also, a PDCCH search space may be classified into a common search space and a terminal-specific (UE-specific) search space. The common DCI may be transmitted through the common search space, and the UE-specific DCI may be transmitted through the UE-specific search space. Alternatively, the UE-specific DCI may be transmitted in the common search space, considering scheduling flexibility, fallback transmission, and the like.

Meanwhile, a slot format of the NR may be composed of a combination of a downlink duration, an unknown duration, and an uplink duration. Each of the downlink duration, the unknown duration and the uplink duration may be composed of one or more consecutive symbols. One slot may include 0, 1, or 2 unknown durations, and the unknown duration may be disposed between the downlink duration and the uplink duration.

The slot format of the NR may be configured semi-statically by a higher layer signaling. The slot format configured semi-statically may be referred to as a 'semi-static slot format'. The semi-static slot format may be configured in a cell-specific manner, and the configuration information of the semi-static slot format may be system information or common RRC information. Also, the semi-static slot format may be additionally configured for each terminal through a UE-specific RRC signaling. For example, the unknown duration according to the slot format configured by the cell-specific signaling procedure may be overridden by the UE-specific RRC signaling to be the downlink duration or the uplink duration.

Also, the slot format may be dynamically indicated by the DCI. The slot format configured dynamically may be referred to as a 'dynamic slot format'. The unknown duration according to the semi-static slot format configuration may be overridden by the dynamic slot format (e.g., SFI) to be the downlink duration or the uplink duration. One SFI may indicate a slot format applied to one or more consecutive slots, and the number of slots to which one SFI is applied may be smaller than a SFI monitoring period.

Anchor Bandwidth Part

The system information (e.g., MSI, OSI, RMSI, etc.) and the paging message may be broadcast to a plurality of unspecified terminals in the cell. Therefore, a common PRB set and a common numerology may be defined so that a plurality of terminals receive a PDSCH including the system information or the paging message using the same DCI. The common PRB set and the common numerology may be defined as an anchor bandwidth part.

The anchor bandwidth part may be used for transmission of broadcast information (e.g., RMSI, OSI, paging message, etc.), and the anchor bandwidth part may be defined in downlink. In uplink, a PRACH resource region may be configured separately regardless of the anchor bandwidth part. Also, the PUSCH resource region for transmitting Msg3 may be allocated in another bandwidth part instead of the anchor bandwidth part. In the following embodiments, the anchor bandwidth part may mean a bandwidth part configured in downlink.

Information on the frequency region (e.g., number of PRBs, frequency location, etc.) occupied by the anchor bandwidth part may be derived from the frequency region of the SS/PBCH block or PBCH. Alternatively, the frequency region occupied by the anchor bandwidth part may be configured by the PBCH. The numerology of the anchor bandwidth part may be configured by the PBCH. The numerology of the anchor bandwidth part may differ from the numerology for the SS/PBCH block. For example, a 30 kHz subcarrier spacing may be used for transmission of the SS/PBCH block, and a 15 kHz subcarrier spacing may be used for transmission of physical channels except the SS/PBCH block within the anchor bandwidth part. The frequency region of the SS/PBCH block used to derive or configure the frequency region of the anchor bandwidth part may be included in the frequency region of the corresponding anchor bandwidth part.

On the other hand, in the 4-step random access procedure, the terminal transmitting the PRACH may expect to receive Msg2 from the base station, and the terminal may receive Msg2 in the anchor bandwidth part. For example, the terminal may receive a DCI that schedules a PDSCH including Msg2 through a PDCCH configured in the anchor bandwidth part (e.g., PDCCH logically associated with the anchor bandwidth part). At the reception of Msg2, a downlink operating bandwidth of the terminal may be limited to only the anchor bandwidth part. In this case, it may be natural that the terminal receives Msg2 in the anchor bandwidth part. If the downlink operating bandwidth of the terminal at the time of reception of Msg2 is set to a different bandwidth part instead of the anchor bandwidth part, the terminal may receive Msg2 through another bandwidth part. However, the signaling overhead may increase because a PBCH (e.g., MSI) or RMSI including configuration information of another bandwidth part should be transmitted from the base station to the terminal.

The control resource set or the PDCCH common search space may be configured by PBCH (e.g., MSI) or RMSI. The common search space configured by the PBCH may be logically associated with the anchor bandwidth part. According to the logical association between the common search space and the anchor bandwidth part, the terminal receiving the DCI in the common search space may determine that the PDSCH scheduled by the received DCI is the PDSCH transmitted in the anchor bandwidth part. Also, the terminal may determine that a PRB index or an RBG index indicated by the DCI is a local index defined within the anchor bandwidth part.

The DMRS used for demodulating the physical channel within the anchor bandwidth part may be generated based on the PRBs constituting the anchor bandwidth part, and may be mapped to REs. For example, when the anchor bandwidth part is composed of 24 PRBs, the mapping starting point of the DMRS in the frequency domain may be one of the 24 PRBs. Also, the length of the sequence of DMRS may be defined based on 24 PRBs. For example, when a DMRS pattern is composed of 4 REs per port in one PRB, the sequence length of the DMRS per port may be 24×4=96.

Secondary Bandwidth Part

In the fourth step of the random access procedure, the terminal may expect to receive Msg4 from the base station. Msg4 may be unicast data transmitted to a specific terminal. The PDSCH including Msg4 may be scheduled by a DCI scrambled by a temporary cell-radio network temporary identifier (TC-RNTI) or a cell-RNTI (C-RNTI). The terminal may receive the unicast data at a reception time point of Msg4 or after the reception time point of Msg4.

The transmission of Msg4 or unicast data may generally be scheduled by the DCI obtained in the UE-specific search space. However, in some cases (e.g., fallback), the transmission of Msg4 or unicast data may be scheduled by the DCI obtained in the common search space. Since the transmission of Msg4 or unicast data is scheduled by the UE-specific DCI, each of Msg4 and unicast data may not necessarily be transmitted in the anchor bandwidth part. Also, when the TB size of the unicast data is relatively large and the bandwidth of the anchor bandwidth part is relatively small, the size of the TB that can be scheduled in one slot of the anchor bandwidth pert may be limited. Also, when the terminal can arbitrarily change a quasi co-location (QCL) assumption to receive broadcast information in the anchor bandwidth part, the terminal may be required to receive QCL-related information from the base station in order to receive the unicast data in the anchor bandwidth part.

Therefore, a separate bandwidth part may be configured for unicast transmission. The bandwidth part for the transmission of Msg4 or unicast data may be configured through an initial access procedure of the terminal. The bandwidth part for the transmission of Msg4 or unicast data may be referred to as a 'secondary bandwidth part'. The secondary bandwidth part may be configured for downlink transmission.

Meanwhile, in the NR, in addition to the PRB grid defined in the bandwidth part, a broader concept common RB grid may be used to support wideband operations. The common RB grid may be defined as a virtual RB grid that is a reference within a specific frequency region regardless of the frequency region physically occupied by a carrier or bandwidth part. The common RB grid may be used as a basis for configuring a carrier or bandwidth part, and a location of a specific RB (e.g., first RB or first subcarrier in the first RB) of the common RB grid may be configured in the terminal as an offset with a specific RB (e.g., first RB or first subcarrier in the first RB) of an SS/PBCH block. The common RB grid may be defined for each subcarrier spacing.

The DMRS used for demodulation of physical channels within the secondary bandwidth part may be generated based on the common RB grid, and may be mapped to REs. For example, a RB #100 of the common RB grid may be a PRB #0 of a specific bandwidth part configured in the first terminal and a PRB #50 of a specific bandwidth part configured in the second terminal simultaneously. In this case, the DMRS may be generated based on an RB index (i.e., RB #100) of the common RB grid regardless of a local PRB index within the specific bandwidth part, and may be mapped to REs.

Therefore, the base station may generate a DMRS for the first terminal and a DMRS for the second terminal based on a code division multiplexing (CDM) scheme, and map the DMRS for the first terminal and the DMRS for the second terminal to the same REs. Also, RSs (e.g., CSI-RS, SRS) transmitted within the secondary bandwidth part may be generated based on the common RB grid and may be mapped to REs. When the secondary bandwidth part overlaps with the UE-specific bandwidth part, the same RSs (e.g., CSI-RS, SRS) may be used in both the secondary bandwidth part and the UE-specific bandwidth part. Accordingly, the RS overhead can be reduced.

In order to quickly obtain the effect described above, it may be advantageous that the secondary bandwidth part is configured at the earliest time point in the terminal. Accordingly, the secondary bandwidth part may be configured in the terminal by Msg2. The terminal may obtain configuration information of the secondary bandwidth part from Msg2 received via the PDSCH, and configure the secondary bandwidth part based on the obtained configuration information. The transmission of the configuration information of the secondary bandwidth part through Msg2 may have an advantage over transmission of the configuration information of the secondary bandwidth part through RMSI.

In the communication system using multiple beams, the RMSI may be transmitted several times by beam sweeping to cover the entire cell. Since Msg2 is transmitted to the terminal having transmitted Msg1, the number of transmissions of the configuration information of the secondary bandwidth part may be reduced in the communication system using the multiple beams. For example, the base station may transmit Msg2 to the terminal having transmitted a PRACH by using the same beam as the beam used for reception of the PRACH (i.e., Msg1). According to the method described above, up to Msg2 may be transmitted in the anchor bandwidth part, and Msg4 or unicast data may be transmitted in the secondary bandwidth part. In this case, the configuration information of the secondary bandwidth part need not be transmitted at a time earlier than Msg2.

According to the method described above, the anchor bandwidth part may be configured or derived via the PBCH, and the secondary bandwidth part may be configured via Msg2. Meanwhile, it may be difficult for the base station to know the bandwidth capability of the terminal attempting initial access at the time of encoding Msg2. Therefore, the size of each of the anchor bandwidth part and the secondary bandwidth part may be set to be equal to or less than a minimum bandwidth commonly supported by all the terminals. For example, when the minimum bandwidth of the terminal is 20 MHz, the size of each of the anchor bandwidth part and the secondary bandwidth part may be set to 20 MHz or less. The secondary bandwidth part may be configured in common to a plurality of terminals instead of a specific terminal. For example, the configuration information of the secondary bandwidth portion may be cell-specific or terminal group-specific. For example, when the secondary bandwidth part is configured by Msg2, the configuration information of the same secondary bandwidth part within one anchor bandwidth part may be transmitted. Even when Msg2 includes UE-specific information, the configuration information of the same secondary bandwidth part within one anchor bandwidth portion may be transmitted.

The secondary bandwidth part may be a bandwidth part temporarily used by the terminal attempting initial access. Since the NR supports terminals having various bandwidth capabilities, the terminal may transmit UE-specific data in the secondary bandwidth part until the base station acquires bandwidth capability information of the terminal. On the other hand, the base station may operate based on the following two methods after obtaining the bandwidth capability information of the terminal attempting initial access.

As a first method, a base station may inform a terminal (e.g., wideband terminal) supporting a bandwidth (e.g., 100 MHz) wider than the size of the secondary bandwidth part (e.g., 20 MHz) of configuration information of a wideband carrier, and may additionally configure a new bandwidth part for the terminal. The new bandwidth part for the terminal may be configured by RRC signaling and configured for each of downlink and uplink. When the new bandwidth part is configured, the terminal may perform transmission using the new bandwidth part in the wideband carrier. In this case, the terminal may not use the secondary bandwidth part. For example, the terminal may not monitor the UE-specific search space logically associated with the secondary bandwidth part. Alternatively, the terminal may maintain the configuration of the secondary bandwidth part, and may perform transmission using both the new bandwidth part and the secondary bandwidth part. Alternatively, when the new bandwidth part is not configured, the terminal may perform transmission using the secondary bandwidth part.

As a second method, a base station may inform a terminal (e.g., narrowband terminal) supporting the same or similar bandwidth (e.g., 20 MHz) as the size of the secondary bandwidth part (e.g., 20 MHz) that the secondary bandwidth part is regarded as a system bandwidth (or carrier bandwidth, channel bandwidth) or effective PRBs of a narrowband carrier, and the secondary bandwidth part is recognized as a carrier. A time when the terminal regards the secondary bandwidth part as a carrier may be defined based on a specific operation of the base station or the terminal. Alternatively, the time when the terminal regards the secondary bandwidth part as a carrier may be derived from a time point at which the base station informs the terminal through signaling. For example, the base station may transmit to the terminal an indicator (e.g., an indicator having a size of 1 bit) instructing the terminal to regard the secondary bandwidth part as a carrier.

In order to prevent the terminal from reconfiguring the bandwidth part when considering the secondary bandwidth part as a carrier, the size (e.g., the number of PRBs) of the secondary bandwidth part may be set to one (e.g., the number of PRBs corresponding to a system bandwidth) of system bandwidths supported by the NR. For example, when the NR supports a system bandwidth of 20 MHz, the size of the secondary bandwidth part may be set to 20 MHz. Alternatively, when the NR supports a carrier with 100 PRBs for a specific subcarrier spacing, the secondary bandwidth part may be composed of 100 consecutive PRBs in the frequency domain.

On the other hand, the characteristics of the downlink secondary bandwidth part may be equally applied to the downlink anchor bandwidth part. For example, the respective PDSCH for transmission of Msg4 or unicast data may be transmitted in the downlink anchor bandwidth part. The UE-specific search space in which the DCI scheduling the PDSCH for transmission of each of Msg4 and unicast data may be configured within the anchor bandwidth part. The UE-specific search space may be logically associated with the anchor bandwidth part. In this case, the terminal may monitor both the common search space and the UE-specific search space in the anchor bandwidth part.

When a data channel is scheduled by a common DCI received in the common search space, the terminal may assume that a DMRS sequence of the data channel is generated based on a local PRB index in the anchor bandwidth part. For example, the DMRS sequence of the data channel may be generated based on the first PRB (e.g., PRB #0) or the first subcarrier (e.g., subcarrier #0) of the first PRB within the anchor bandwidth part, and may be mapped to REs. The common DCI received in the common search space may be a specific common DCI.

When the data channel is scheduled by the DCI received in the UE-specific search space, the terminal may assume that the DMRS sequence of the data channel is generated based on an RB index of a common RB grid. For example, the DMRS sequence of the data channel may be generated based on the first RB (e.g., RB #0) of the common RB grid or the first subcarrier (e.g., subcarrier #0) of the first RB, and may be mapped to REs. This method may be referred to as 'Method 110'.

In Method 110, the data channel scheduled by a specific common DCI may be a PDSCH including RMSI (hereinafter referred to as an 'RMSI PDSCH'). Since the reception time of the RMSI PDSCH is before the acquisition time of the RMSI configuration information, the terminal may not use the common RB grid for RE mapping of the DMRS sequence of the RMSI PDSCH. Therefore, the RE mapping of the DMRS sequence of the RMSI PDSCH may be defined based on the anchor bandwidth part. On the other hand, the reception time of Msg4 or unicast data may be after the reception time of the RMSI. Therefore, after acquiring the configuration information of the common RB grid from the RMSI, the terminal may generate the DMRS of the PDSCH based on the common RB grid, and map the DMRS to REs.

Meanwhile, the terminal operating in the RRC connected state may receive the RMSI PDSCH in a bandwidth part other than the anchor bandwidth part. In this case, the DMRS generation and RE mapping of the RMSI PDSCH may be defined based on the common RB grid. That is, Method 110 may be applied to the anchor bandwidth part.

Configuration of Reserved Resources

In order to provide forward compatibility, specific time-frequency resources may be configured as reserved resources in the NR. The terminal may not transmit or receive any signal basically in the time-frequency resources configured as the reserved resources. The base station may configure the reserved resources via an RRC signaling (e.g., signaling of system information, UE-specific RRC signaling) or a physical layer signaling (e.g., common DCI, group common DCI, downlink scheduling DCI). Also, the base station may configure the reserved resources by a combination of RRC signaling and physical layer signaling. That is, the base station may transmit configuration information of the reserved resources to the terminal using at least one of RRC signaling and physical layer signaling. A time domain configuration unit (unit or granularity) of the reserved resources may be T symbols, and a frequency domain configuration unit of the reserved resources may be K subcarriers or L PRBs. Here, each of T, K, and L may be a natural number.

For example, when T=1 and L=1, the reserved resources may be configured as a combination of symbol(s) and PRB(s). The reserved resources may be configured in at least one of the time domain and the frequency domain. For example, when the reserved resources are configured only in the time domain, it may be assumed that the entire band of the carrier or the entire band of the bandwidth part in which the reserved resources are configured is configured as the reserved resources in the frequency domain. On the other hand, when the reserved resources are configured only in the frequency domain, it may be assumed that all resources in the time domain are configured as the reserved resources.

Meanwhile, when one or more bandwidth parts are configured in the terminal, the base station may configure reserved resources for each bandwidth part. This method may be referred to as 'Method 300'. In Method 300, the reserved resources in the time-frequency domain may be configured according to a numerology (e.g., subcarrier spacing and CP length) of each of the bandwidth parts, and may be limited to physical resources occupied by each of the bandwidth parts. In particular, the reserved resources in the frequency domain may be configured to the PRBs or subcarriers that constitute each of the bandwidth parts. The bandwidth part may include all time resources in the time domain, and the reserved resources may be configured in symbols or slots in the time domain. The reserved resources may be configured in each of the uplink bandwidth part and the downlink bandwidth part.

When first reserved resources for a terminal is configured in a first bandwidth part by Method 300, the terminal may assume that any physical layer signal or channel (e.g., physical layer signal or channel logically associated with the first bandwidth part) is not transmitted through the first bandwidth part in the first reserved resources. Here, the physical layer signal may be DMRS, CSI-RS, SRS, phase tracking reference signal (PT-RS), or the like, which is configured or scheduled in the first bandwidth part, and the physical layer channel may be a control channel, a data channel, or the like, which is scheduled in the first bandwidth part. In particular, when a resource region of the data channel (e.g., PDSCH, PUSCH) scheduled in the first bandwidth part includes the first reserved resources, the data channel may be transmitted or received as rate-matched around the first reserved resources.

On the other hand, the terminal may transmit or receive a physical layer signal or channel (e.g., physical layer signal or channel logically associated with a second bandwidth part) in a different bandwidth part (e.g., the second bandwidth part) in the first reserved resources. Here, the physical layer signal may be DMRS, CSI-RS, SRS, PT-RS, or the like, which is configured or scheduled in the second bandwidth part instead of the first bandwidth part, and the physical layer channel may be a control channel, a data channel, or the like, which is configured or scheduled in the second bandwidth part instead of the first bandwidth part. The method described above may be applied to either or both cases where the first bandwidth part is activated or deactivated. The first bandwidth part and the second bandwidth part may be basically bandwidth parts having the same transmission direction (e.g., downlink or uplink).

Alternatively, the transmission direction of the first bandwidth part may be different from the transmission direction of the second bandwidth part. For example, the first bandwidth part may be a downlink bandwidth part, and the second bandwidth part may be an uplink bandwidth part.

For example, when the first downlink bandwidth part composed of 50 contiguous PRBs is configured in the terminal, the base station may configure reserved resources for the first downlink bandwidth part in the terminal. For example, when the first downlink bandwidth part is composed of PRBs #0 to #49 (i.e., local PRBs #0 to #49 of the first downlink bandwidth part), the base station may configure the PRBs #10 to #19 of the first bandwidth part as reserved resources in the frequency domain, and may configure the fifth and sixth symbols in each slot as reserved resources in the time domain. The terminal may assume that any physical layer signal or channel is not transmitted or received in REs corresponding to a combination of the PRBs and symbols configured by the base station as the reserved resources.

Here, a physical layer channel transmitted through the first downlink bandwidth part may be a PDCCH logically associated with the first downlink bandwidth part, a PDSCH scheduled by the PDCCH, and the like, and the physical layer signal transmitted through the first downlink bandwidth part may be a DMRS used for demodulating the PDCCH and the PDSCH, a reference signal configured in the first downlink bandwidth part, and the like. Also, the terminal may not perform other operations (e.g., CSI/radio resource management (RRM)/radio link monitoring (RLM) measurement operations) defined for the first downlink bandwidth part in the reserved resources configured in the first downlink bandwidth part.

In the following embodiments, a case where the base station further configures the second downlink bandwidth part in the same carrier to the terminal will be described. Here, a frequency region of the second downlink bandwidth part may overlap a frequency region of the first downlink bandwidth part. For example, the second downlink bandwidth part may be composed of 100 contiguous PRBs (e.g., PRBs #0 to #99), and a frequency region occupied by the PRBs #0 to #49 may overlap with the frequency region of the first downlink bandwidth part. In this case, the base station may configure reserved resources for the second downlink bandwidth part in the terminal. For example, the base station may configure the PRBs #30 to #39 (i.e., local PRBs #30 to #39 of the second downlink bandwidth part) in the second downlink bandwidth part as reserved resources. The terminal may assume that any physical layer signal or channel is not transmitted through the second downlink bandwidth part in the reserved resources (e.g., PRBs #30 to #39) configured by the base station. Also, the terminal may not perform other operations (e.g., CSI/RRM/RLM measurement) defined for the second downlink bandwidth part in the reserved resources configured in the second downlink bandwidth part.

Meanwhile, the terminal may expect to receive a physical channel signal or channel through the second downlink bandwidth part in the reserved resources configured for the first downlink bandwidth part. For example, the terminal may expect to receive a PDSCH scheduled in the second downlink bandwidth part in the reserved resources (e.g., REs corresponding to a combination of the PRBs #10 to #19 and the fifth and sixth symbols in each slot) configured for the first downlink bandwidth part. For example, the PDSCH scheduled for the second downlink bandwidth part may be a mini-slot PDSCH for Ultra Reliable Low Latency Communication (URLLC) transmission.

That is, the terminal may receive enhanced Mobile Broadband (eMBB) data through the first downlink bandwidth part, and receive URLLC data through the second downlink bandwidth part. The base station may reserve the corresponding reserved resources as physical resources for the URLLC transmission of the second downlink bandwidth part by configuring the reserved resources in the first downlink bandwidth part. That is, a data channel (e.g., data channel for eMBB transmission) scheduled in the first downlink bandwidth part may be transmitted as rate-matched around the reserved resources configured in the first downlink bandwidth part, and accordingly the reserved resources configured within the first downlink bandwidth part may be used for transmission of a data channel (e.g., data channel for URLLC transmission) scheduled in the second downlink bandwidth part. The reservation of physical resources may be configured through at least one of a higher layer signaling and a physical layer signaling as described above. Here, overlapped bandwidth parts (e.g., the first downlink bandwidth part and the second downlink bandwidth part) may be activated simultaneously for reserved resource-based communication.

Conversely, the terminal may expect to receive a physical layer signal or channel through the first bandwidth part in the reserved resources configured for the second downlink bandwidth part. For example, the terminal may expect to receive a PDSCH scheduled in the first downlink bandwidth part in the PRBs #30 to #39 configured as reserved resources for the second downlink bandwidth part. In this case, the first downlink bandwidth part and the second downlink bandwidth part may be activated simultaneously in the terminal. When a plurality of bandwidth parts are configured in the terminal, the terminal may perform a transmission and reception operation of a physical layer signal or channel through one bandwidth part using reserved resources configured for another bandwidth part. The embodiments described above may be equally applied to the uplink bandwidth part.

Figure 3:
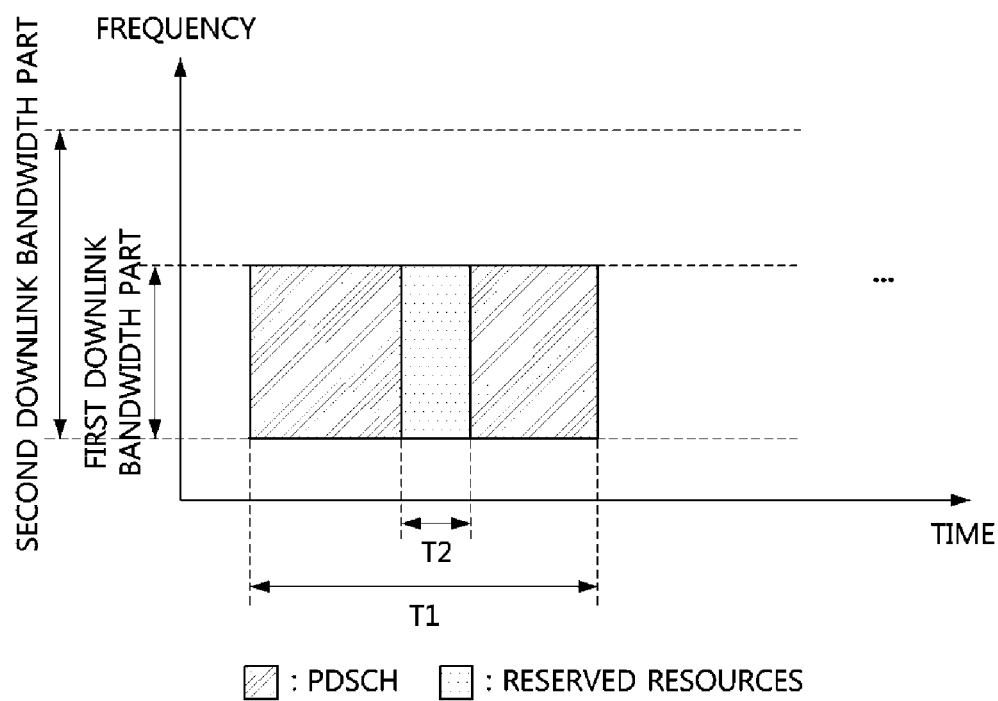
FIG. 3 is a conceptual diagram illustrating a first embodiment of a reserved resource configuration method according to Method 300 in a communication system.

FIG. 3 is a conceptual diagram illustrating a first embodiment of a reserved resource configuration method according to Method 300 in a communication system.

Referring to FIG. 3, a first downlink bandwidth part and a second downlink bandwidth part may be configured in one terminal, and a frequency region of the first downlink bandwidth part may overlap with a frequency region of the second downlink bandwidth part. The base station may configure some resources (i.e., a resource region having a duration T2) of the first downlink bandwidth part in a resource region overlapped between the first downlink bandwidth part and the second downlink bandwidth part as reserved resources, and transmit configuration information of the reserved resources to the terminal. Here, the reserved resources may be configured as a resource region in which a PDSCH can be transmitted in the second downlink bandwidth part. In this case, the reserved resources may be used to multiplex two PDSCHs with different transmission durations.

The terminal may receive a PDSCH having a transmission duration of T1 through the remaining resource regions excluding the reserved resources in the first downlink bandwidth part, and receive a PDSCH having a transmission duration T2 (e.g., a PDSCH scheduled in the second downlink bandwidth part) through the reserved resources. Here, the PDSCH (e.g., the PDSCH transmitted and received in the first downlink bandwidth part) may be rate-matched around the reserved resources. The terminal may assume that the PDSCH scheduled in the first downlink bandwidth part is not received in the reserved resources having the duration T2. T1 and T2 may each be a time duration occupied by one or more consecutive symbols. For example, T1 may be a transmission duration of a PDSCH by slot-based scheduling, and T2 may be a transmission duration of a PDSCH by a mini-slot-based scheduling. For example, T1 may be used for transmission of eMBB data, and T2 may be used for transmission of URLLC data.

Also, the operations described above may be applied to uplink transmission. For example, the first uplink bandwidth part and the second uplink bandwidth part may be configured in one terminal, and a frequency region of the first uplink bandwidth part may overlap with a frequency region of the second uplink bandwidth part. The base station may configure some resources of the first uplink bandwidth part in a resource region overlapped between the first uplink bandwidth part and the second uplink bandwidth part as reserved resources, and transmit configuration information of the reserved resources to the terminal. Here, the reserved resources may be configured as a resource region in which a PDSCH can be transmitted in the second uplink bandwidth part.

The base station may receive a PUSCH having a transmission duration of T1 through the remaining resource regions excluding the reserved resources in the first uplink bandwidth part, and receive a PUSCH having a transmission duration T2 (e.g., a PDSCH scheduled in the second uplink bandwidth part) through the reserved resources. Here, the PUSCH (e.g., the PDSCH transmitted and received in the first uplink bandwidth part) may be rate-matched around the reserved resources. The terminal may assume that the PUSCH scheduled in the first uplink bandwidth part is not transmitted in the reserved resources having the duration T2.

According to the embodiment described above (e.g., the embodiment according to Method 300), the base station may efficiently transmit eMBB data and URLLC data to the terminal. That is, a resource region for URLLC data transmission may be reserved in advance, and a PDSCH or PUSCH for eMBB data may not be mapped to the reserved resource region. Therefore, when URLLC data is generated, the base station may quickly transmit the URLLC data to the terminal through the reserved resource region. When a resource region for URLLC data transmission is not reserved and the PDSCH or PUSCH for eMBB data transmission is already scheduled in a slot at the time when the URLLC data is generated, the base station may perform scheduling for transmission of the URLLC data after completing the transmission of the PDSCH or PUSCH. Alternatively, the base station may transmit a PDSCH or PUSCH for the URLLC data in the resource region of the already-scheduled PDSCH or PUSCH.

The scheme of scheduling the URLLC data in a resource region after completing the transmission of the already-scheduled PDSCH or PUSCH may not satisfy URLLC transmission requirements since a scheduling time latency is caused. The scheme of transmitting the PDSCH or PUSCH for the URLLC data in a resource region of the already-scheduled PDSCH or PUSCH may correspond to a preemption scheme of the resource for transmission of the URLLC data. In this case, the complexity of the transceiver may increase, and further signaling may be required to indicate to the terminal whether or not the preemption is applied.

In Method 300, a cross bandwidth part scheduling scheme may be used. For example, when a PDCCH of the first downlink bandwidth part schedules a PDSCH of the second downlink bandwidth part, the PDSCH may be regarded as a physical channel transmitted through the second downlink bandwidth part even though the PDSCH is scheduled through the first downlink bandwidth part. Accordingly, when the first downlink bandwidth part and the second downlink bandwidth part are activated simultaneously or only the second downlink bandwidth part is active, the terminal may receive the PDSCH of the second downlink bandwidth part scheduled through the first downlink bandwidth part in the reserved resources in the first downlink bandwidth part.

Meanwhile, a plurality of carriers may be configured based on Method 300. For example, the base station may configure reserved resources for each carrier, and may inform the terminal of configuration information of the reserved resources through a signaling procedure. When each of the plurality of carriers is defined in different frequency regions, it may be natural that the reserved resources are configured for each carrier. When frequency regions of a plurality of carriers configured and activated in one terminal are partially or entirely overlapped, the reserved resources may be configured in a frequency region overlapped among the plurality of carriers.

Therefore, a configuration operation of the reserved resources and terminal operations in the reserved resources may be defined for each carrier. For example, when a first carrier and a second carrier configured for a terminal are activated, the terminal may assume that a physical layer signal or channel is not transmitted through the first carrier in the reserved resources configured for the first carrier, and that a physical layer signal or channel is not transmitted through the second carrier in the reserved resources configured for the second carrier.

On the other hand, when the reserved resources of the first carrier overlap with a physical resource of the second carrier, the terminal may expect that the physical layer signal or channel through the second carrier is transmitted in the reserved resources of the first carrier. Also, when the reserved resources of the second carrier overlap with a physical resource of the first carrier, the terminal may expect that the physical layer signal or channel through the first carrier is transmitted in the reserved resources of the second carrier. That is, when frequency regions of a plurality of carriers configured in a terminal are overlapped, resources reserved for a specific carrier may be used to transmit a physical layer signal or channel of another carrier.

The SFI may be used for physical layer signaling of reserved resources. The SFI may be included in a DCI transmitted through a group common PDCCH. The SFI may be used to inform the terminal of types of symbols (e.g., downlink symbol, uplink symbol, unknown symbol) that constitute each of one or more slots. The terminal may expect to receive a downlink signal or channel in the downlink symbols identified based on the SFI, expect to transmit an uplink signal or channel in the uplink symbols identified based on the SFI, and assume that that any signal or channel is not transmitted or received in the unknown symbols identified based on the SFI. Therefore, the operation of the terminal in the unknown symbols may be similar to the operation of the terminal in the reserved resources.

When a plurality of bandwidth parts are configured in one terminal for one transmission direction (e.g., downlink or uplink), the base station may transmit a group common PDCCH to the terminal for each of the plurality of bandwidth parts, and a DCI transmitted through the group common PDCCH may include a SFI of each of the plurality of bandwidth parts. Alternatively, the SFI of each of the plurality of bandwidth parts may be included in the DCI transmitted through one group common PDCCH. For example, the DCI transmitted through one group common PDCCH may include a plurality of SFIs, information indicating a bandwidth part corresponding to each of the plurality of SFIs, and the like. Alternatively, the information indicating a bandwidth part corresponding to each of the plurality of SFIs may be preconfigured in the terminal through a higher layer signaling instead of the DCI. The operation and assumption of the terminal in the unknown region (e.g., unknown symbols) in a slot may be limited to the corresponding bandwidth part (e.g., overlapped bandwidth part) similarly to Method 300. This method may be referred to as 'Method 310'.

Meanwhile, the terminal may apply one SFI received through the group common PDCCH to a plurality of bandwidth parts. For example, the terminal may receive at most one group common PDCCH in one carrier, and one group common PDCCH may include one SFI. In this case, a bandwidth part (e.g., effective bandwidth part) to which the SFI included in the group common PDCCH is applied and a bandwidth part (e.g., ineffective bandwidth part) to which the SFI included in the group common PDCCH is not applied may be preconfigured by a higher layer signaling. The downlink region, the uplink region, and the unknown region configured by the SFI may be effective only in the effective bandwidth part. Configuration information of the effective and ineffective bandwidth parts may be transmitted through the group common PDCCH together with the SFI.

Since the NR supports a plurality of numerologies, a reference subcarrier spacing for interpreting a slot format configured by the SFI may be considered. The base station may configure a reference subcarrier spacing of a dynamic slot format in the terminal. The reference subcarrier spacing of the dynamic slot format may be configured through a higher layer signaling procedure (e.g., RRC signaling procedure) or a physical layer signaling procedure (e.g., DCI signaling procedure). When the physical layer signaling procedure is used, the SFI may include the reference subcarrier spacing.

In this case, only a bandwidth part configured with a subcarrier spacing equal to or greater than the reference subcarrier spacing may be limited to be configured as the effective bandwidth part to which the SFI is applied. That is, when a subcarrier spacing of a bandwidth part is smaller than the reference subcarrier spacing, the interpretation of the slot format in the corresponding bandwidth part may be ambiguous. This problem will be described in detail in the embodiments related to configuration of a semi-static slot format below. When a subcarrier spacing of a bandwidth part is smaller than the reference subcarrier spacing, the slot format of the bandwidth part may be configured to be equal to or similar to each of Method 400, Method 410, and Method 420.

In this case, the effective bandwidth part and the ineffective bandwidth part may overlap in a specific resource region, and a resource region configured as unknown symbols by the SFI may exist in the specific overlapping specific resource region. Also in this case, Method 300 may be similarly applied. That is, the terminal may assume that a physical layer signal or channel is not transmitted and received through the effective bandwidth part in the unknown region, and may expect that a physical layer signal or channel is transmitted and received through the ineffective bandwidth part in the unknown region.

Configuration of a Semi-Static Slot Format

In the following embodiments, methods of configuring a semi-static slot format will be described. A repetition period of the semi-static slot format may include 0.5 ms, 0.625 ms, 1 ms, 1.25 ms, 2 ms, 2.5 ms, 5 ms, 10 ms, and the like, and some repetition periods of the semi-static slot format may only be applied to a specific subcarrier spacing. Also, a semi-static slot format may be configured such that a slot format having a repetition period of $T_1$ ms and a slot format having a repetition period of $T_2$ ms are continuously allocated. In this case, a repetition period of the semi-static slot format may be $(T_1+T_2)$ ms, and each of $T_1$ and $T_2$ may be configured to be one among the repetition periods described above.

The order of transmission directions of a cell-specific semi-static slot format may be configured to 'downlink→unknown→uplink' within one period. The unknown symbol may be regarded as a symbol whose transmission direction is not strictly defined, but in the embodiments of the present invention, the 'unknown' may also be regarded as a type of transmission direction for convenience. Cell specific semi-static slot format information may include x1, x2, y1, and y2. x1 may be the number of full downlink slots allocated in a starting region of the repetition period, and x2 may be the number of downlink symbols allocated after the x1 downlink slots. y1 may be the number of full uplink slots allocated in an ending region of the repetition period, and y2 may be the number of uplink symbols allocated before the y1 uplink slots. The duration not represented by x1, x2, y1, and y2 may be regarded as an unknown duration.

The reference subcarrier spacing used to configure the semi-static slot format may be configured in the terminal. For example, the reference subcarrier spacing may be system information, and the reference subcarrier spacing may be broadcast with configuration information of the cell specific semi-static slot format. The reference subcarrier spacing may be set to one of available subcarrier spacings (e.g., 15 kHz, 30 kHz, 60 kHz, and 120 kHz) for data transmission.

Figure 4:
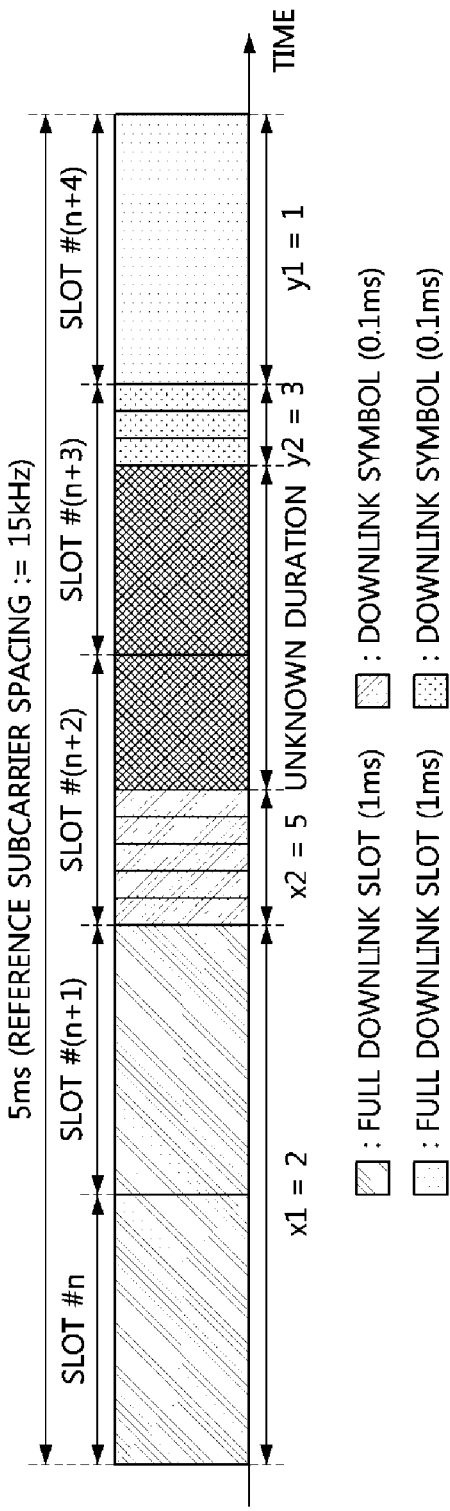
FIG. 4 is a conceptual diagram illustrating a first embodiment of a semi-static slot format in a communication system.
Figure 5:
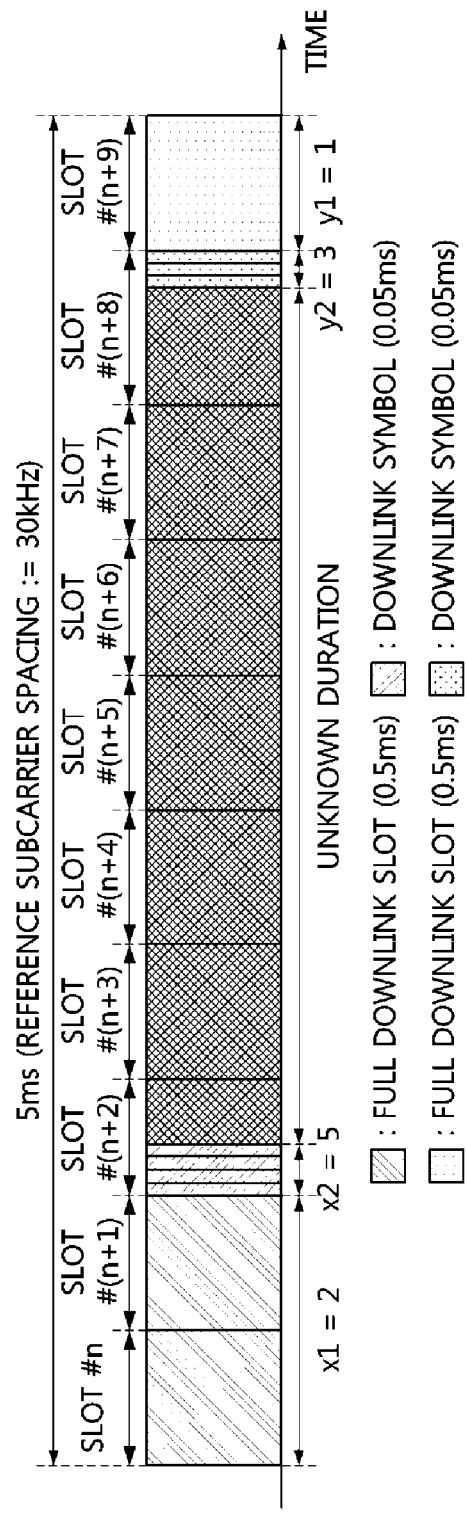
FIG. 5 is a conceptual diagram illustrating a second embodiment of a semi-static slot format in a communication system.

FIG. 4 is a conceptual diagram illustrating a first embodiment of a semi-static slot format in a communication system, and FIG. 5 is a conceptual diagram illustrating a second embodiment of a semi-static slot format in a communication system.

Referring to FIG. 4, a reference subcarrier spacing may be 15 kHz, and a repetition period of a semi-static slot format may be 5 ms, and (x1, x2, y1, y2) may be configured to (2, 5, 1, 3). In this case, one repetition period may be composed of 5 slots. Referring to FIG. 5, a reference subcarrier spacing may be 30 kHz, and a repetition period of a semi-static slot format may be 5 ms, and (x1, x2, y1, y2) may be configured to (2, 5, 1, 3). In this case, one repetition period may be composed of 10 slots. As described above, even when the repetition period and (x1, x2, y1, y2) are the same, a slot structure may vary according to the reference subcarrier spacing. For example, when the repetition period and (x1, x2, y1, y2) are the same, a ratio of the unknown duration may be increased as the reference subcarrier spacing is larger.

Meanwhile, the configuration information of the bandwidth part may include a subcarrier spacing. The base station may inform the terminal of a subcarrier spacing used in a bandwidth part when configuring a downlink bandwidth part or an uplink bandwidth part in the terminal. Therefore, the subcarrier spacing of the bandwidth part configured in the terminal may be different from the reference subcarrier spacing of the semi-static slot format. When the subcarrier spacing of the bandwidth part differs from the reference subcarrier spacing of the semi-static slot format, methods for interpreting and applying a semi-static slot format in the bandwidth part may be defined.

Figure 6:
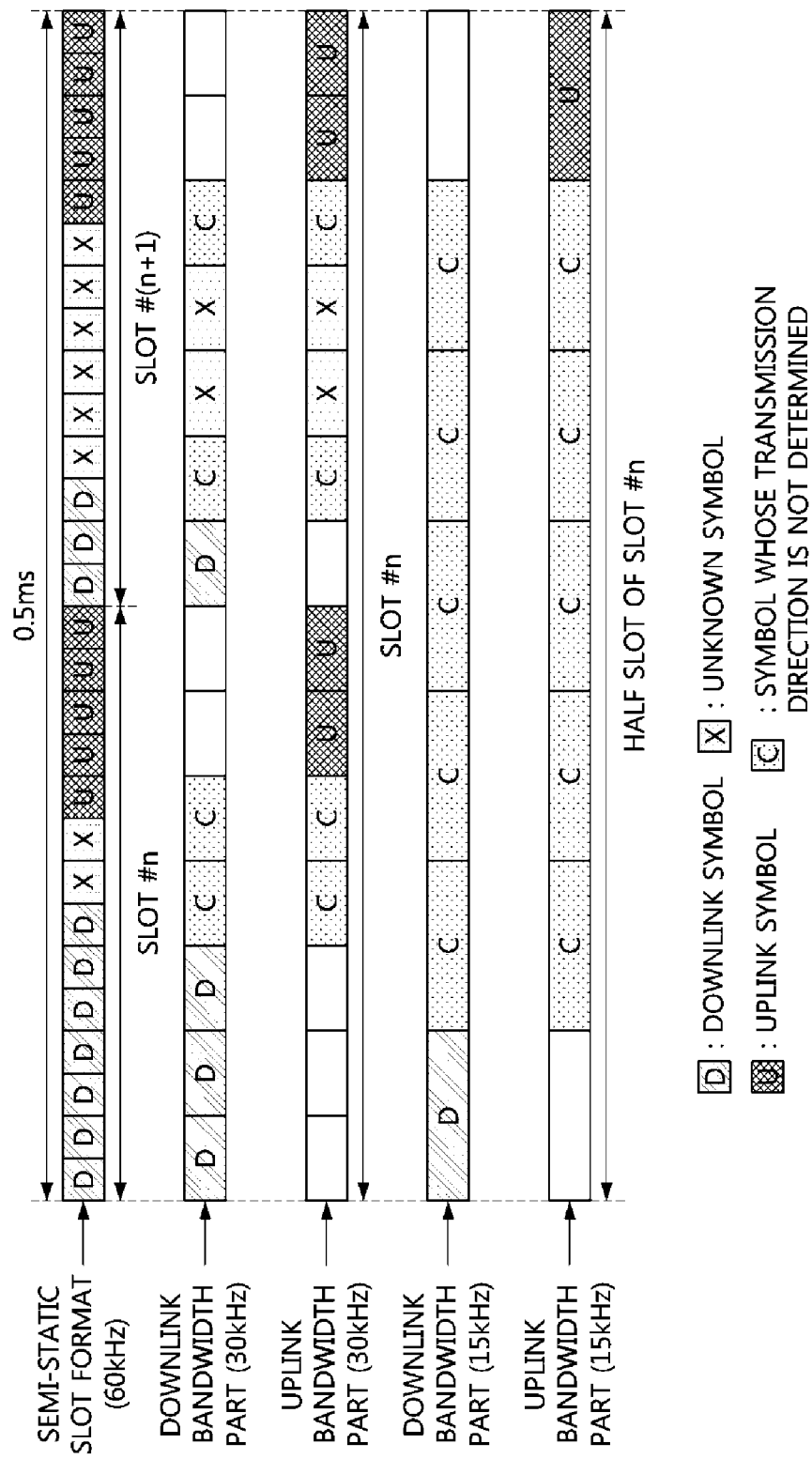
FIG. 6 is a conceptual diagram illustrating a first embodiment of configuration of a semi-static slot format and a bandwidth part in a communication system.

FIG. 6 is a conceptual diagram illustrating a first embodiment of configuration of a semi-static slot format and a bandwidth part in a communication system.

Referring to FIG. 6, a repetition period of a semi-static slot format may be 0.5 ms, and a reference subcarrier spacing may be 60 kHz. There may be 2 slots (e.g., slots #n and #(n+1)) in one repetition period, and the order of symbols allocated in the 2 slots may be 'downlink symbol→unknown symbol→uplink symbol'. Here, 'D' may indicate a downlink symbol, 'X' may indicate an unknown symbol, 'U' may indicate an uplink symbol, and 'C' may indicate a symbol whose transmission direction is to be defined according to a transmission direction collision, etc.

In this case, a subcarrier spacing of a bandwidth part configured in the terminal may vary. When a subcarrier spacing of a bandwidth part is 60 kHz, the subcarrier spacing of the bandwidth part matches the reference subcarrier spacing, so that the terminal may have no problem in interpreting the slot format. On the other hand, when a subcarrier spacing of a bandwidth part is smaller than 60 kHz, there may be a symbol C whose transmission direction is not determined. For example, when a subcarrier spacing of a downlink bandwidth part and an uplink bandwidth part is 30 kHz, one symbol of the bandwidth part corresponds to 2 symbols according to the semi-static slot format, so that one symbol of the bandwidth part may correspond to 'downlink symbol and unknown symbol', 'uplink symbol and unknown symbol', or the like according to the semi-static slot format. In this case, it may be difficult to determine the transmission direction of the symbol of the bandwidth part only by the configuration information of the semi-static slot format.

Alternatively, when a subcarrier spacing of a downlink bandwidth part and an uplink bandwidth part is 15 kHz, one symbol of the bandwidth part corresponds to 4 symbols according to the semi-static slot format, so that one symbol of the bandwidth part may correspond to 'downlink symbol and unknown symbol', 'uplink symbol and unknown symbol', 'downlink symbol and uplink symbol', or the like according to the semi-static slot format. In this case, it may be difficult to determine the transmission direction of the symbol of the bandwidth part only by the configuration information of the semi-static slot format.

On the other hand, when the subcarrier spacing of the bandwidth part is greater than the reference subcarrier spacing of the semi-static slot format, the above-described problem may not occur.

Figure 7:
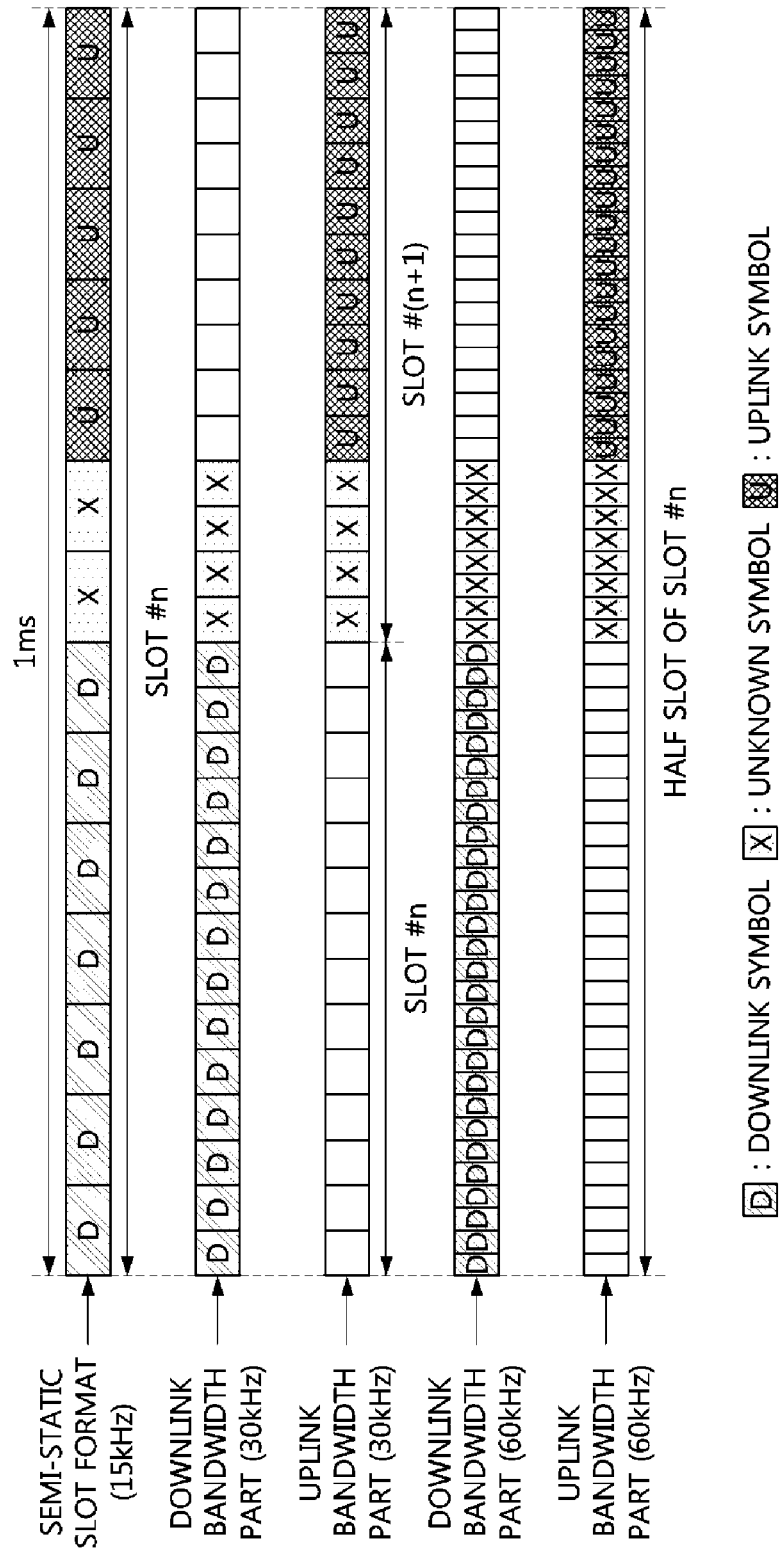
FIG. 7 is a conceptual diagram illustrating a second embodiment of configuration of a semi-static slot format and a bandwidth part in a communication system.

FIG. 7 is a conceptual diagram illustrating a second embodiment of configuration of a semi-static slot format and a bandwidth part in a communication system.

Referring to FIG. 7, a repetition period of a semi-static slot format may be 1 ms, and a reference subcarrier spacing may be 15 kHz. There may be one slot (e.g., slot #n) in one repetition period, and the order of symbols allocated in the one slot may be 'downlink symbol→unknown symbol→uplink symbol'. In this case, the subcarrier spacing of the bandwidth part configured in the terminal may be greater than 15 kHz (i.e., the reference subcarrier spacing of the semi-static slot format). For example, when the subcarrier spacing of the bandwidth part is 30 kHz or 60 kHz, since one symbol of the bandwidth part always corresponds to one symbol according to the semi-static slot format, transmission directions of all the symbols constituting the bandwidth part within the repetition period may be clearly determined only by the configuration information of the semi-static slot format.

In the following embodiments, methods for solving the problem described with reference to FIG. 6 (i.e., the problem in which the subcarrier spacing of the bandwidth part is configured to be smaller than the reference subcarrier spacing of the semi-static slot format) will be described.

In a first method, the subcarrier spacing of the bandwidth part may be set to be greater than or equal to the reference subcarrier spacing of the semi-static slot format. In this case, the terminal may not expect that the subcarrier spacing of the bandwidth part is configured to be smaller than the reference subcarrier spacing of the semi-static slot format. This method may be referred to as 'Method 400'. When Method 400 is used and the subcarrier spacing of the bandwidth part is greater than the reference subcarrier spacing of the semi-static slot format, the terminal may identify the slot format of the bandwidth part based on the method described with reference to FIG. 7.

When subcarrier spacing candidate(s) that can be configured as the subcarrier spacing of the bandwidth part are predefined for each frequency band, the smallest subcarrier spacing among the subcarrier spacing candidate(s) may be defined as the reference subcarrier spacing of the semi-static slot format. This method may be referred to as 'Method 401'. For example, when the subcarrier spacing of the bandwidth part in a specific frequency band is set to 15 kHz, 30 kHz, or 60 kHz, the reference subcarrier spacing of the semi-static slot format may be defined as 15 kHz. However, when a bandwidth part having a subcarrier spacing of 15 kHz is not used in a specific frequency band, the configuration of the semi-static slot format according to Method 401 may be inefficient. For example, when only a subcarrier spacing of 30 kHz is used for data transmission in a specific frequency band, the reference subcarrier spacing in the semi-static slot format may be preferably set to 30 kHz.

In order to solve the disadvantage of Method 401, 'Method 402' may be used. In Method 402, a plurality of reference subcarrier spacings may be allowed per frequency band, and the reference subcarrier spacing of the semi-static slot format may be set to be equal to or less than the subcarrier spacing of the bandwidth part. According to Method 402, the base station may use the smallest subcarrier spacing among subcarrier spacings actually used for data transmission in a cell or a carrier as the reference subcarrier spacing of the semi-static slot format. Therefore, when Method 402 is used, the inefficiency according to Method 401 may not occur.

Even when Method 402 is used, all terminals in the cell should use the same reference subcarrier spacing, so that a granularity of the semi-static slot format for a terminal using a subcarrier spacing greater than the reference subcarrier spacing may not be fine. For example, when one terminal operates in a bandwidth part having a subcarrier spacing of 15 kHz and the other terminal operates in a bandwidth part having a subcarrier spacing of 60 kHz, the reference subcarrier spacing of the semi-static slot format may be set to 15 kHz. In this case, the semi-static slot format for the terminal operating in the bandwidth part having a subcarrier spacing of 60 may be configured in four symbol units. This may be inappropriate for URLLC transmission. Thus, according to Method 400, Method 401, or Method 402, it may be difficult to simultaneously transmit eMBB data and URLLC data in the same cell.

In a second method for solving the problem described with reference to FIG. 6, it may be allowed that the subcarrier spacing of the bandwidth part is set to be smaller than the reference subcarrier spacing of the semi-static slot format, and a transmission direction of a specific symbol may be determined by a predefined rule when a collision of transmission directions occurs in the specific symbol of a bandwidth part (e.g., when the specific symbol of the bandwidth part corresponds to a plurality of symbols having different transmission directions according to the semi-static slot format). This method may be referred to as 'Method 410'. Further, 'Method 411' to 'Method 416' which are the detailed methods of Method 410 may be defined.

In Method 411, when a specific symbol of the bandwidth part corresponds to 'downlink symbol and unknown symbol', 'unknown symbol and uplink symbol' or 'downlink symbol, unknown symbol, and uplink symbol', a transmission direction of the specific symbol in the bandwidth part may be regarded as 'unknown'. That is, when transmission directions according to the semi-static slot format are collided in one symbol of the bandwidth part, a rule that the unknown takes precedence over the downlink and uplink may be used.

Conversely, when the transmission directions according to the semi-static slot format in one symbol of the bandwidth part collide, a rule that the downlink and uplink take precedence over the unknown may be used. This method may be referred to as 'Method 412'. According to Method 412, the unknown duration according to the semi-static slot format may be overridden to be a downlink duration or an uplink duration in the bandwidth part. However, it is not desirable that the unknown duration is overridden to a different transmission direction (e.g., downlink or uplink) when the unknown duration is used for ensuring flexibility of the transmission direction or for protecting a specific signal. Also, according to the result of the overriding, a slot structure in which an unknown duration does not exist between the downlink duration and the uplink duration may occur. In order to avoid such the case, it may be preferable to use Method 411 rather than Method 412.

Also, when a specific symbol of the bandwidth part corresponds to 'downlink symbol and uplink symbol' according to the semi-static slot format, a transmission direction of the specific symbol in the bandwidth part may be set to a predefined transmission direction among downlink and uplink. This method may be referred to as 'Method 413'. Alternatively, the transmission direction of the specific symbol in the bandwidth part may be set to unknown. This method may be referred to as 'Method 414'. According to Method 413, cross-link interference may occur. Therefore, it may be desirable that the transmission direction of the specific symbol in which a transmission direction collision occurs in the bandwidth part is regarded as the unknown. Even when the transmission direction of the specific symbol in which a transmission direction collision occurs in the bandwidth part is regarded as the unknown by Method 414, the specific symbol regarded as the unknown may then be used for downlink transmission or uplink transmission by scheduling of the base station.

Alternatively, when a transmission direction collision according to the semi-static slot format occurs in a specific symbol of the bandwidth part, the transmission direction of the specific symbol in the bandwidth part may be set to a transmission direction occupying a relatively large duration in the specific symbol. This method may be referred to as 'Method 415'. One of Method 411 to Method 414 may be used when the lengths of the durations (e.g., downlink duration, unknown duration, and uplink duration) are identical.

Figure 8:
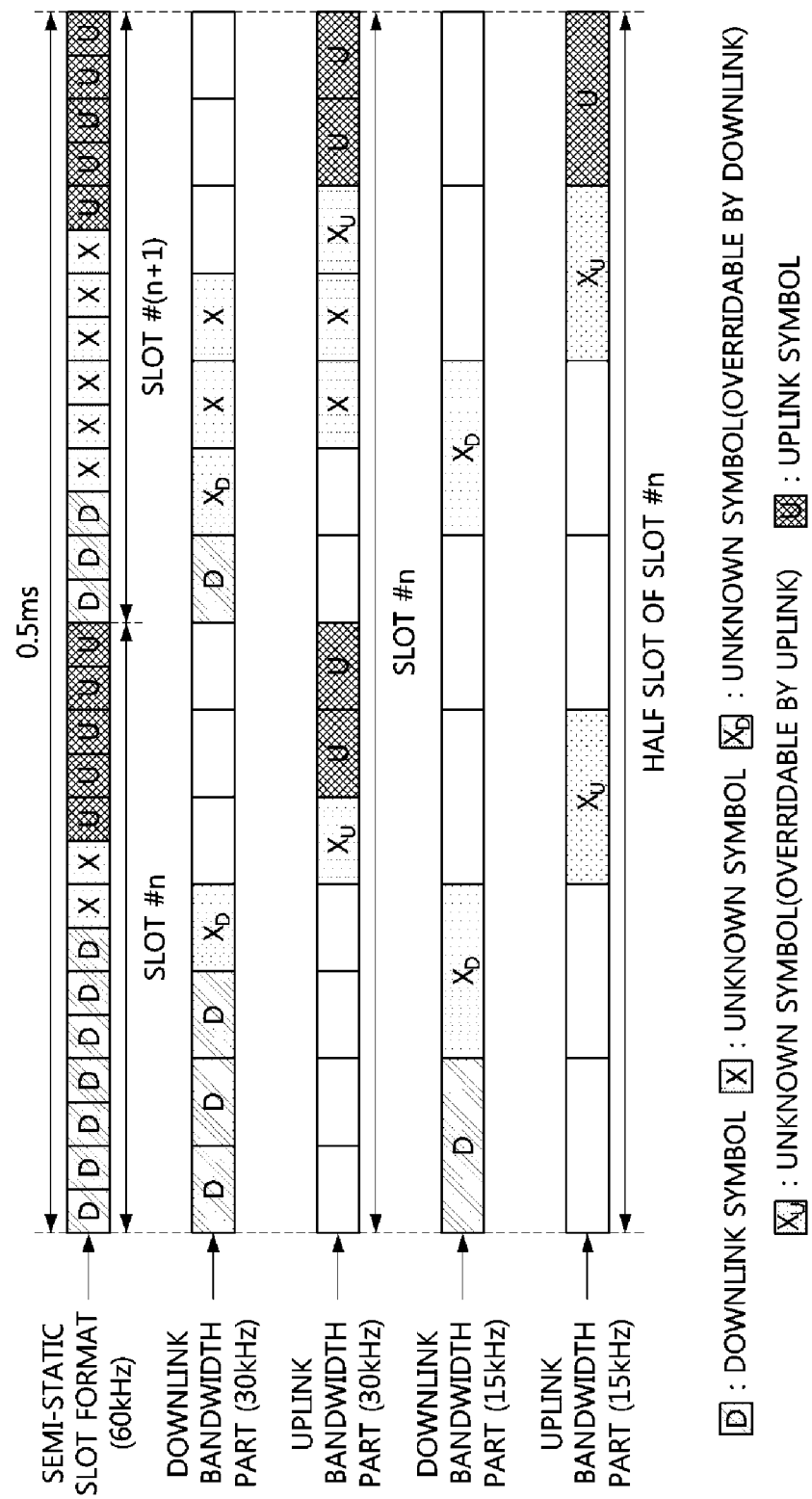
FIG. 8 is a conceptual diagram illustrating a first embodiment of a slot format of a bandwidth part according to Method 411 in a communication system.

FIG. 8 is a conceptual diagram illustrating a first embodiment of a slot format of a bandwidth part according to Method 411 in a communication system.

Referring to FIG. 8, a repetition period of a semi-static slot format may be 0.5 ms, and a reference subcarrier spacing may be 60 kHz. When a subcarrier spacing of a downlink bandwidth part and an uplink bandwidth part is 30 kHz, a collision between the downlink and the unknown may occur in the fourth and ninth symbols in the downlink bandwidth part within one repetition period of the semi-static slot format, and a collision between the uplink and the unknown may occur in the fifth and twelfth symbols in the uplink bandwidth part within one repetition period of the semi-static slot format. According to Method 411, the fourth and ninth symbols in the downlink bandwidth part may be regarded as unknown symbols, and the fifth and twelfth symbols in the uplink bandwidth part may be regarded as unknown symbols.

Here, since the collision between the downlink and the unknown may occur in the fourth and ninth symbols in the downlink bandwidth part, the fourth and ninth symbols regarded as unknown symbols in the downlink bandwidth part may be overridden only to be downlink symbols. Since the collision between the uplink and the unknown may occur in the fifth and twelfth symbols in the uplink bandwidth part, the fifth and twelfth symbols regarded as unknown symbols in the uplink bandwidth part may be overridden only to be uplink symbols. That is, the type of the unknown in the fourth and ninth symbols in the downlink bandwidth part may be different from the type of the unknown in the fifth and twelfth symbols in the uplink bandwidth part.

When a subcarrier spacing of a downlink bandwidth part and an uplink bandwidth part is 15 kHz, a collision between the downlink and the unknown may occur in the second and fifth symbols in the downlink bandwidth part within one repetition period of the semi-static slot format, and a collision between the uplink and the unknown may occur in the third and sixth symbols in the uplink bandwidth part within one repetition period of the semi-static slot format. According to Method 411, the second and sixth symbols in the downlink bandwidth part may be regarded as unknown symbols, and the third and sixth symbols in the uplink bandwidth part may be regarded as unknown symbols.

Here, since the collision between the downlink and the unknown may occur in the second and fifth symbols in the downlink bandwidth part, the second and fifth symbols regarded as unknown symbols in the downlink bandwidth part may be overridden only to be downlink symbols. Since the collision between the uplink and the unknown may occur in the third and sixth symbols in the uplink bandwidth part, the third and sixth symbols regarded as unknown symbols in the uplink bandwidth part may be overridden only to be uplink symbols.

Meanwhile, when a subcarrier spacing of a downlink bandwidth part and an uplink bandwidth part is 15 kHz, a slot of a bandwidth part within one repetition period of a semi-static slot format may be configured as a half slot comprising 7 symbols. Therefore, a slot format of the bandwidth part may be repeated in 7 symbol units. In this case, there may be a plurality of unknown durations that are not intended in one slot. Therefore, one repetition period of the semi-static slot format may be configured to comprise n slots of the bandwidth part, and n may be an integer greater than or equal to 1. This method may be referred to as 'Method 416'. The base station may appropriately determine configuration parameters (e.g., repetition period, reference subcarrier spacing) of the semi-static slot format and configuration parameter (e.g., subcarrier spacing) of the bandwidth part, so as to ensure the conditions of Method 416.

Alternatively, when Method 416 is not used, one repetition period of the slot format in the bandwidth part may be allowed to include a part of one slot (e.g., half slot). In this case, it is preferable that one repetition period of the slot format in the bandwidth part includes m full symbols. m may be an integer equal to or greater than 1.

In a third method for solving the problem described with reference to FIG. 6, semi-static slot formats for different reference subcarrier spacings may be configured. That is, a plurality of semi-static slot formats may be configured to the terminal. This method may be referred to as 'Method 420'. For example, when a reference subcarrier spacing of the semi-static slot format is set to 15 kHz, 30 kHz, or 60 kHz, the base station may configure a semi-static slot format having a reference subcarrier spacing of 15 kHz (hereinafter referred to as a 'first slot format'), and a semi-static slot format having a reference subcarrier spacing of 30 kHz (hereinafter referred to as a 'second slot format').

When a downlink bandwidth part and an uplink bandwidth part are configured in the terminal, a semi-static slot format having a reference subcarrier spacing identical to a subcarrier spacing of the bandwidth part may be applied to the corresponding bandwidth part. This method may be referred to as 'Method 426'. When a downlink bandwidth part and an uplink bandwidth part having a subcarrier spacing of 30 kHz are configured in the terminal, the second slot format may be applied to the corresponding bandwidth part.

When Method 420 and Method 426 are used, the terminal may expect that the subcarrier spacing of the bandwidth part is set to one of the reference subcarrier spacing(s) according to the configuration of the semi-static slot format. When the subcarrier spacing of the bandwidth part does not match the reference subcarrier spacing, the terminal may regard the configuration of the bandwidth part as erroneous, and may not perform operations related to the corresponding bandwidth part. For example, when the terminal expects a bandwidth part having a 15 kHz or 30 kHz subcarrier spacing to be configured, and the terminal configures a bandwidth part having a 60 kHz subcarrier spacing in the terminal, the terminal may ignore the configuration of the bandwidth part having a 60 kHz subcarrier spacing.

Method 420 and Method 426 may be applied on a bandwidth part basis. That is, when a plurality of downlink bandwidth parts or a plurality of uplink bandwidth parts are configured in the terminal, a semi-static slot format having a reference subcarrier spacing identical to a subcarrier spacing configured in each of the bandwidth parts may be applied to the corresponding bandwidth part. For example, when semi-static slot formats having reference subcarrier spacings of 15 kHz and 30 kHz, a downlink bandwidth part having a subcarrier spacing of 15 kHz, and a downlink bandwidth part having a subcarrier spacing of 30 kHz are configured in the terminal, the terminal may apply the semi-static slot format having a reference subcarrier interval of 15 kHz to the downlink bandwidth part having a subcarrier spacing of 15 kHz, and the semi-static slot format having a reference subcarrier spacing of 30 kHz to the downlink bandwidth part having a subcarrier spacing of 30 kHz.

Meanwhile, when a plurality of downlink bandwidth parts or a plurality of uplink bandwidth parts are configured in the terminal, one semi-static slot format having a specific reference subcarrier spacing may be applied to the plurality of bandwidth parts. This method may be referred to as 'Method 427'. For example, when semi-static slot formats having reference subcarrier spacings of 15 kHz and 30 kHz, a downlink bandwidth part having a subcarrier spacing of 15 kHz, and a downlink bandwidth part having a subcarrier spacing of 30 kHz are configured in the terminal, the terminal may apply the semi-static slot format having a reference subcarrier spacing of 15 kHz to both the downlink bandwidth parts having subcarrier spacings of 15 kHz and 30 kHz.

In Method 427, a criterion by which the terminal determines a reference subcarrier spacing that is commonly applied to one or more bandwidth parts may be predefined in the specification. For example, the terminal may determine the smallest subcarrier spacing (hereinafter referred to as 'Δfmin') among the subcarrier spacing(s) of the bandwidth part(s) configured by the base station as the reference subcarrier spacing. When a semi-static slot format having a reference subcarrier spacing identical to Δfmin is not configured in the terminal, the terminal may apply a semi-static slot format having the greatest subcarrier spacing among reference subcarrier spacing(s) smaller than Δfmin to the bandwidth part(s). When the above-described rule is used and the subcarrier spacing of the bandwidth part is greater than the reference subcarrier spacing, the terminal may obtain the slot format of the bandwidth part by using the method described with reference to FIG. 6.

Alternatively, the terminal may apply the semi-static slot format having the greatest reference subcarrier spacing among the reference subcarrier spacing not larger than the subcarrier spacing of the bandwidth part to the corresponding bandwidth part. This method may be referred to as 'Method 428'. For example, when semi-static slot formats having reference subcarrier spacings of 15 kHz and 30 kHz, and downlink bandwidth parts having subcarrier spacings of 15 kHz, 30 kHz, and 60 kHz are configured in the terminal, according to Method 408, the terminal may apply the semi-static slot format having a reference subcarrier interval of 15 kHz to the downlink bandwidth part having a subcarrier spacing of 15 kHz, and the semi-static slot format having a reference subcarrier spacing of 30 kHz to the downlink bandwidth parts having subcarrier spacings of 30 kHz and 60 kHz.

When a plurality of semi-static slot formats having different reference subcarrier spacings are configured in the terminal by Method 420, the transmission directions of symbols according to the semi-static slot format may be aligned in the time domain between the reference subcarrier spacings. This method may be referred to as 'Method 421'. Alternatively, each of the semi-static slot formats may be configured independently of one another, and the transmission directions of the symbols according to the semi-static slot format may not be aligned in the time domain. This method may be referred to as 'Method 422'. When Method 422 is used, a high degree of freedom in the configurability may be provided, however, cross-link interference may be caused between the bandwidth parts having different subcarrier spacings in the same cell. On the other hand, when Method 421 is used, cross-link interference in the same cell may be suppressed.

When Method 422 is used, repetition periods of the plurality of semi-static slot formats may be the same or different. On the other hand, when Method 421 is used, it may be desirable that the repetition periods of the plurality of semi-static slot formats are configured to be the same.

Figure 9A:
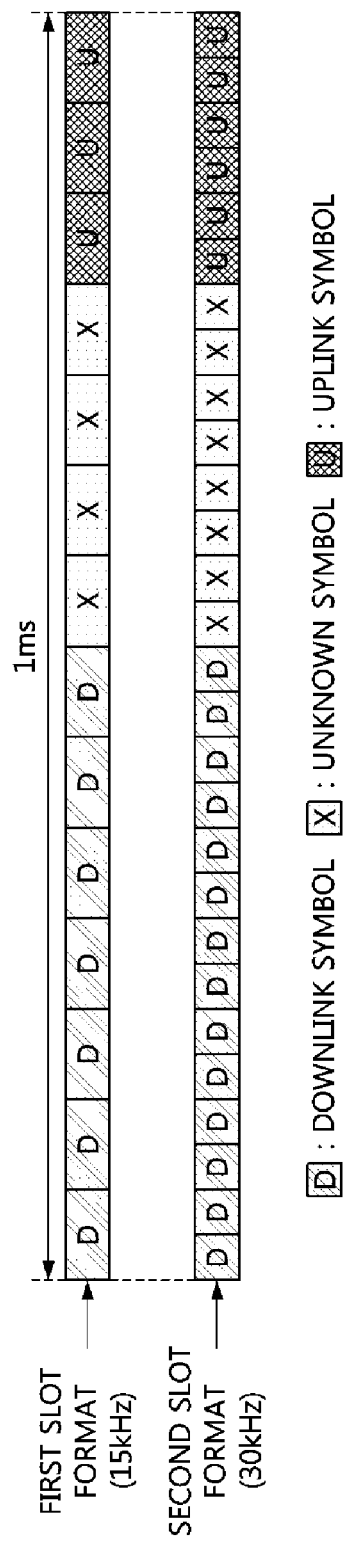
FIG. 9A is a conceptual diagram illustrating a first embodiment of a semi-static slot format according to Method 421.
Figure 9B:
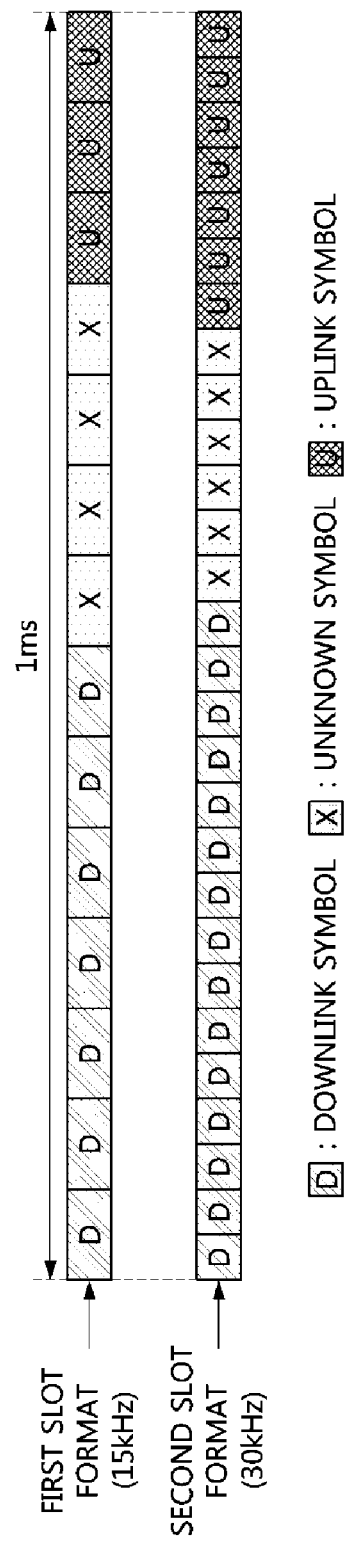
FIG. 9B is a conceptual diagram illustrating a second embodiment of a semi-static slot format according to Method 421.
Figure 9C:
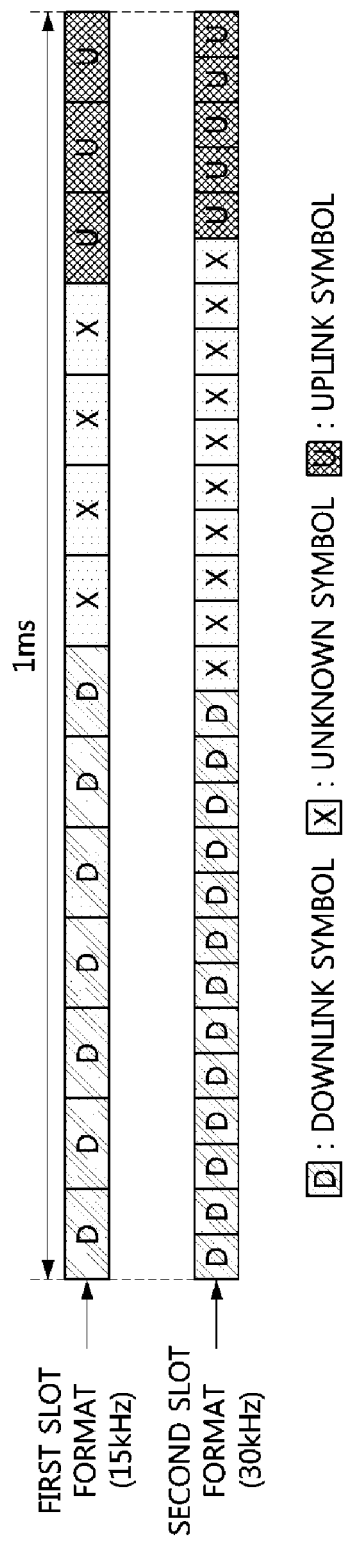
FIG. 9C is a conceptual diagram illustrating a third embodiment of a semi-static slot format according to Method 421.

FIG. 9A is a conceptual diagram illustrating a first embodiment of a semi-static slot format according to Method 421, FIG. 9B is a conceptual diagram illustrating a second embodiment of a semi-static slot format according to Method 421, and FIG. 9C is a conceptual diagram illustrating a third embodiment of a semi-static slot format according to Method 421.

Referring to FIGS. 9A to 9C, the base station may configure a semi-static slot format having a reference subcarrier spacing of 15 kHz (hereinafter referred to as a 'first slot format') and a semi-static slot format having a reference subcarrier spacing of 30 kHz (hereinafter referred to as a 'second slot format'). The repetition period of the first slot format and the second slot format may be 1 ms.

In the embodiment of FIG. 9A, the transmission direction of the first slot format in the time domain may be the same as the transmission direction of the second slot format. That is, the transmission direction of one symbol of the first slot format may be the same as the transmission direction of the two symbols of the second slot format corresponding to one symbol of the first slot format. This method may be referred to as 'Method 423'.

On the other hand, in the embodiment of FIG. 9B and the embodiment of FIG. 9C, there may be a duration in which the transmission direction of the first slot format does not coincide with the transmission direction of the second slot format in the time domain. For example, in the embodiment of FIG. 9B, the eighth symbol of the first slot format may correspond to 'downlink symbol and unknown symbol' of the second slot format, and the eleventh symbol of the first slot format may correspond to 'unknown symbol and uplink symbol' of the second slot format.

That is, the unknown symbol of the first slot format may be aligned with the 'downlink symbol and unknown symbol' or 'unknown symbol and uplink symbol' of the second slot format. This method may be referred to as 'Method 424', and Method 424 may be similar to Method 411 described above. When the reference subcarrier spacing of the first slot format is four times or more the reference subcarrier spacing of the second slot format or the reference subcarrier spacing of the second slot format is four times or more the reference subcarrier spacing of the first slot format, the unknown symbol of the slot format having a relatively small reference subcarrier spacing may correspond to all of the downlink symbol, unknown symbol, and uplink symbol of the slot format having a relatively large reference subcarrier spacing.

As another example, in the embodiment of FIG. 9C, the seventh symbol of the first slot format may correspond to the 'downlink symbol and unknown symbol' of the second slot format, and the twelfth symbol of the first slot format may correspond to the 'unknown symbol and uplink symbol' of the second slot format. That is, the downlink symbol of the first slot format may be aligned with the 'downlink symbol and unknown symbol' of the second slot format, the uplink symbol of the first slot format may be aligned with the 'unknown symbol and uplink symbol' of the second slot format. This method may be referred to as 'Method 425', and Method 425 may be similar to Method 412.

The embodiments of FIGS. 9A to 9C may be applied to the first slot format and the second slot format having various reference subcarrier spacings. Also, Methods 423 to 425 may be used in combination. For example, when Method 424 is combined with Method 425, a specific downlink symbol of the first slot format may correspond to the 'downlink symbol and unknown symbol' of the second slot formation, and a specific unknown symbol of the first slot format may correspond to the 'unknown symbol and uplink symbol' of the second slot format.

When a common repetition period is applied to a plurality of semi-static slot formats in Method 420 and the detailed methods of Method 420, the use of a specific repetition period may be restricted. For example, a repetition period (e.g., 0.625 ms, 1.25 ms, 2.5 ms) that is applied only to a specific reference subcarrier spacing may not be used as a common repetition period for a plurality of semi-static slot formats.

In a fourth method for solving the problem described with reference to FIG. 6, it may be allowed that a subcarrier spacing of a bandwidth part is configured to be smaller than a reference subcarrier spacing of a semi-static slot format, and it may be expected that a collision of transmission directions according to a semi-static slot format does not occur in each of symbols of the bandwidth part. This method may be referred to as 'Method 430'. Regardless of a relationship between the subcarrier spacing of the bandwidth part and the reference subcarrier spacing, the base station may appropriately configure a pattern of the semi-static slot format to avoid the collision of transmission directions. The terminal may expect that the collision of transmission directions does not occur even when any bandwidth part is activated.

The effects of the above-described methods may occur when a CP type applied to the semi-static slot format and a CP type configured in the bandwidth part are the same. The CP type may be classified into a normal CP and an extended CP. On the other hand, when the CP type applied to the semi-static slot format is different from the CP type configured in the bandwidth part, the same effect as described above may not be appreciated because the symbols having different subcarrier spacings are not aligned with each other in the time domain. For example, when a normal CP is applied to the semi-static slot format and an extended CP is configured in the bandwidth part, the above-described methods should be used in a modified manner, and the above-described effects may not occur.

Therefore, when it is desired to use both a normal CP and an extended CP in the bandwidth part, it may be preferable that both a normal CP and an extended CP are configured to be applicable to the semi-static slot format. For this, the configuration information of the semi-static slot format may include a CP type. The CP type may indicate a normal CP or an extended CP used for configuring the bandwidth part. For example, the CP type may be included in the configuration information of the cell-specific semi-static slot format. In this case, the CP type may be transmitted to the terminal as system information. When the configuration information of the semi-static slot format includes the CP type, Method 420 and the detailed methods of Method 420 may be applied to a plurality of semi-static slot formats having the same CP type.

The above-described methods may be applied not only when the reference subcarrier spacing of the semi-static slot format is different from the subcarrier spacing of the bandwidth part, but also when the reference subcarrier spacing of the dynamic slot format is different from the subcarrier spacing of the bandwidth part. For example, when a slot format indicated by the SFI is identified, the terminal may apply the slot format indicated by the SFI to a bandwidth part having a subcarrier spacing other than a reference subcarrier spacing of the slot format indicated by the SFI according to the above-described methods.

Dynamic Switching of Bandwidth Part

When a plurality of downlink bandwidth parts or a plurality of uplink bandwidth parts are configured in the terminal, the base station may transmit a DCI including a field (e.g., bandwidth part indicator field) indicating an index of an active bandwidth part to the terminal. The terminal may transmit or receive a data channel (e.g., PDSCH or PUSCH) scheduled by the DCI in the bandwidth part indicated by the bandwidth part indicator field of the DCI. According to this, the bandwidth part through which the DCI is transmitted may be an active bandwidth part before switching, and the bandwidth part indicated by the DCI may be an active bandwidth part after switching. In the following embodiments, when a bandwidth part is switched, the active bandwidth part before switching may be referred to as a 'first bandwidth part', and the active bandwidth part after switching may be referred to as a 'second bandwidth part'. The terminal may perform switching of the bandwidth part between a reception end point of the DCI in the first bandwidth part and a transmission and reception starting point of a data channel in the second bandwidth part (e.g., a reception starting point of the PDSCH or a transmission starting point of the PUSCH).

Figure 10:
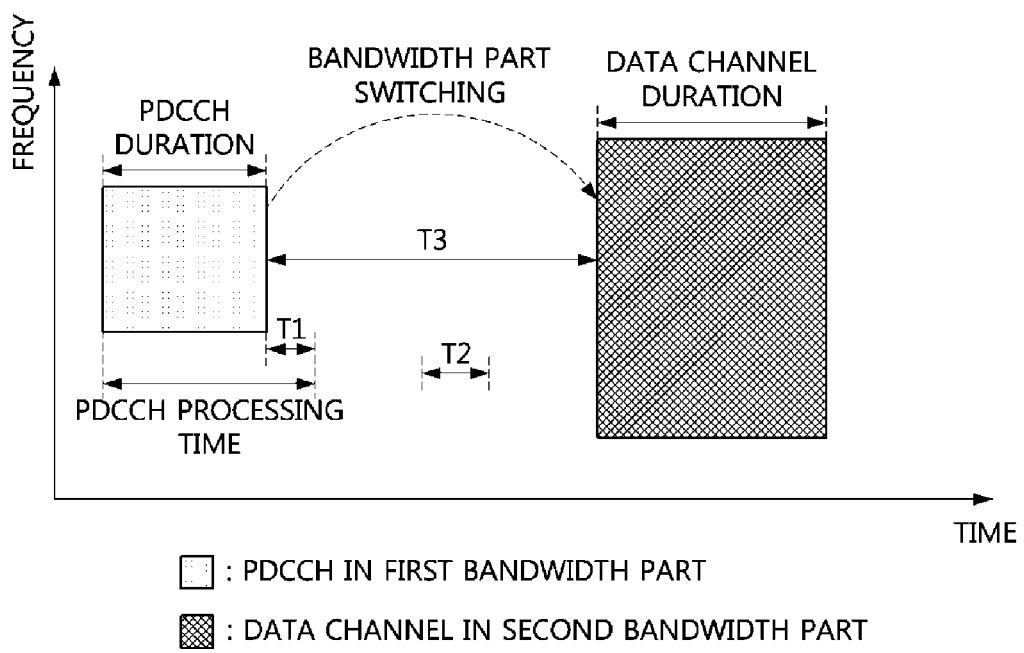
FIG. 10 is a conceptual diagram illustrating a first embodiment of a dynamic switching method of a bandwidth part in a communication system.

FIG. 10 is a conceptual diagram illustrating a first embodiment of a dynamic switching method of a bandwidth part in a communication system.

Referring to FIG. 10, a base station may transmit a DCI to a terminal through a PDCCH in a first bandwidth part. The DCI may include scheduling information of a data channel (e.g., PDSCH or PUSCH), a bandwidth part indicator field, and the like. The bandwidth part indicator field may include an index of a second bandwidth part. The terminal may receive the DCI in the first bandwidth part, and may transmit or receive the data channel (e.g., PDSCH or PUSCH) scheduled by the DCI in the second bandwidth part indicated by the bandwidth part indicator field of the DCI. The terminal may interpret scheduling information of the DCI (e.g., frequency domain resource allocation information, time domain resource allocation information, transmission configuration information (TCI) state, etc.) based on the configuration information of the second bandwidth part (e.g., subcarrier spacing, CP length, beam information, etc.).

In order to switch from the first bandwidth part to the second bandwidth part, it may take some time at the terminal. First, since the terminal should process the PDCCH in order to obtain the DCI (e.g., the DCI including the bandwidth part indicator field) instructing the bandwidth part switching, a PDCCH processing delay time T1 may be considered in a bandwidth part switching time. The PDCCH processing delay time T1 may be a time interval from a reception ending point of the PDCCH to a processing completion point of the PDCCH. Also, T1 may include the PDCCH processing delay time as well as a driving time of other baseband devices. When the DCI is obtained, a time for the terminal to retune a radio frequency (RF) bandwidth to the bandwidth part indicated by the bandwidth part indicator field of the DCI may be needed. The RF retuning time T2 may be several micro seconds to several hundred micro seconds depending on a change ratio of the RF bandwidth and whether a center of the RF bandwidth is moved or not. Also, T2 may include the RF tuning time as well as a driving time of other RF devices (e.g., automatic gain control (AGC)).

When instructing the bandwidth part switching, the base station may schedule the data channel so that the terminal can acquire T1 and T2. When a time interval from the reception ending point of the PDCCH including the DCI to the transmission and reception starting point (e.g., reception stating point of the PDSCH or transmission starting point of the PUSCH) of the data channel scheduled by the DCI is T3, the base station may schedule the data channel so that T3 is equal to or greater than 'T1+T2'. Alternatively, at least one of T1 and T2 may be defined in the specification as the capability of the terminal (e.g., the terminal's requirements). For example, in Method 500, the 'T1+T2' may be predefined in the specification as the capability of the terminal, and the terminal may report the 'T1+T2' to the base station. In Method 501, each of T1 and T2 may be defined in the specification as the capability of the terminal, and the terminal may report each of T1 and T2 to the base station. In Method 502, T2 may be defined in the specification as the capability of the terminal, and the terminal may report T2 to the base station.

The terminal may adjust the RF bandwidth in an arbitrary time duration in 'T3–T1'. That is, the terminal may adjust the RF bandwidth in an arbitrary time interval between the acquisition time of the DCI and the transmission and reception starting time of the data channel scheduled by the DCI. In this case, it is difficult for the base station to know the duration in which the terminal adjusts the RF bandwidth, and the operation of the terminal is unclear at T3 or 'T3–T1', and thus the use of the corresponding duration (e.g., T3 or 'T3–T1') may be restricted. In particular, when T3 is greater than 'T1+T2' (e.g., when cross-slot scheduling is performed), the previously described problem may arise.

In order to solve the above-described problem, the RF transition duration of the terminal may be defined in advance in the specification. Alternatively, the base station may configure the RF transition duration in the terminal. This method may be referred to as 'Method 510'. The RF transition duration may be configured to be equal to or greater than T2, and the terminal may adjust the RF bandwidth within the RF transition duration. Also, the terminal may not perform other operations in addition to the RF bandwidth adjustment operation within the RF transition duration. For example, the terminal may not transmit or receive any signal within the RF transition duration. The terminal may perform a normal transmission and reception operation in a time duration other than the RF transition duration. Method 501 or 502 may be used to ensure that the RF transition duration is set to be equal to or greater than T2 in Method 510. For example, the base station may identify T2 of the terminal according to Method 501 or 502, and may configure the RF transition duration so that the RF transmission duration is equal to or greater than the identified T2.

The RF transition duration for the bandwidth part switching may be composed of N1 consecutive symbols. N1 may be a natural number. The length of the RF transition duration may be expressed as N1. The symbol(s) constituting the RF transition duration may follow a specific numerology (e.g., subcarrier spacing, CP length). Meanwhile, since the RF transition duration exists within T3 in the bandwidth part switching method described above, the location of the RF transition duration may be configured based on the time domain location of the DCI (e.g., PDCCH including the DCI) transmitted in the first bandwidth part or the time domain location of the data channel (e.g., PDSCH or PUSCH) transmitted in the second bandwidth part as a reference. The RF transition duration may be configured as follows.

Figure 11A:
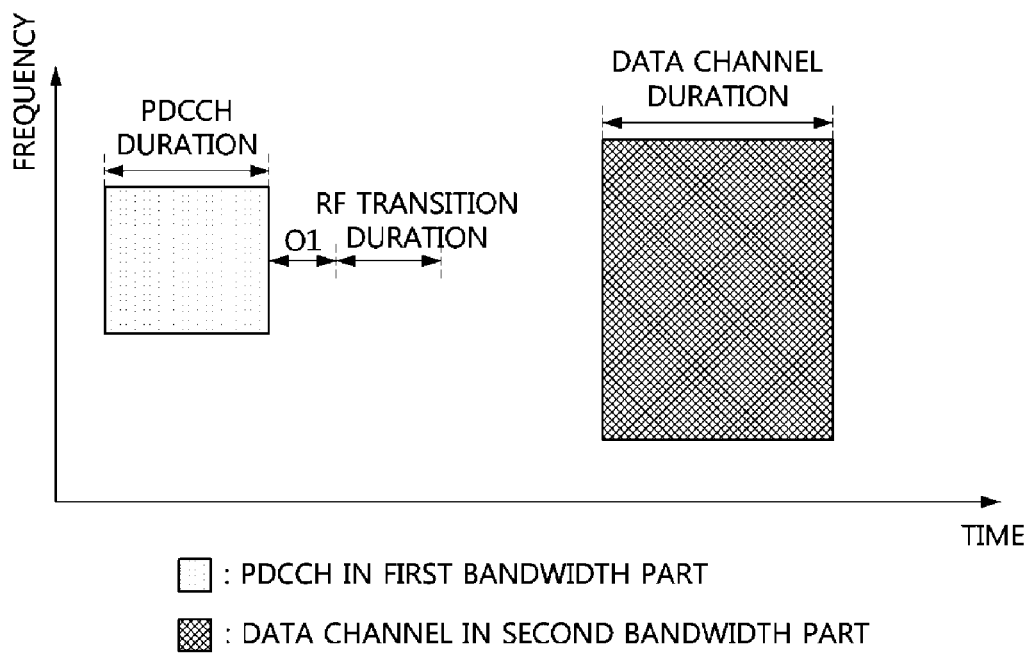
FIG. 11A is a conceptual diagram illustrating a first embodiment of an RF transition duration in a communication system.
Figure 11B:
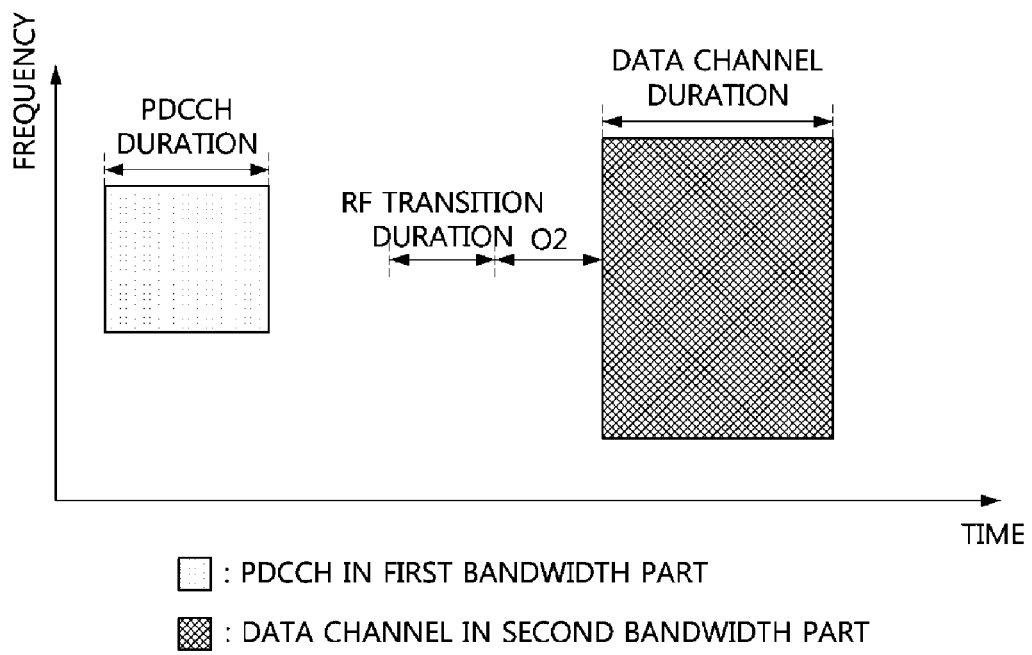
FIG. 11B is a conceptual diagram illustrating a second embodiment of an RF transition duration in a communication system.
Figure 11C:
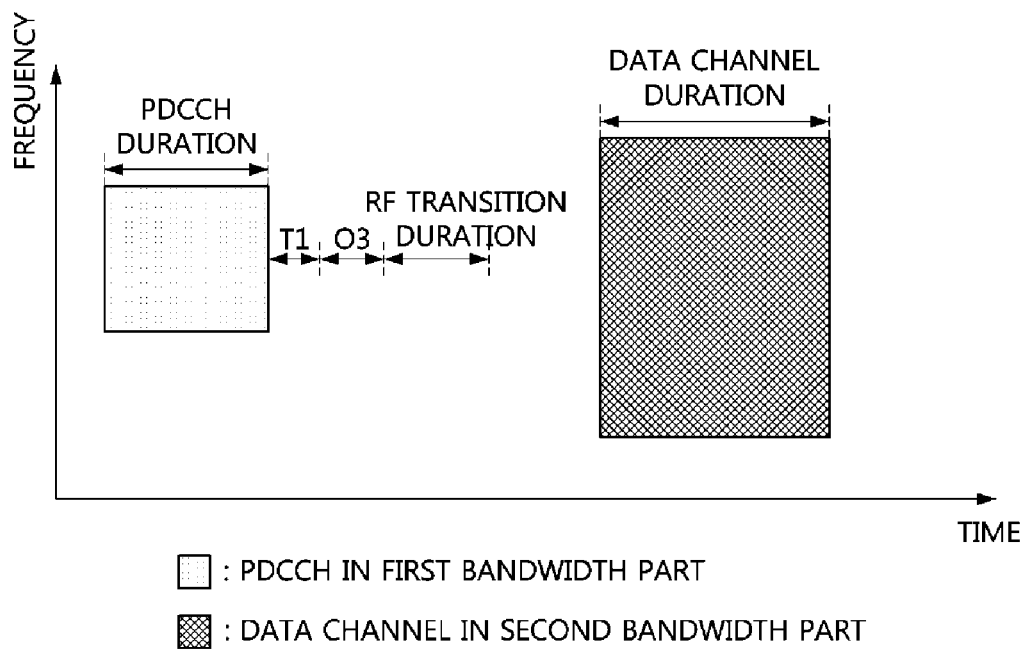
FIG. 11C is a conceptual diagram illustrating a third embodiment of an RF transition duration in a communication system.

FIG. 11A is a conceptual diagram illustrating a first embodiment of an RF transition duration in a communication system, FIG. 11B is a conceptual diagram illustrating a second embodiment of an RF transition duration in a communication system, and FIG. 11C is a conceptual diagram illustrating a third embodiment of an RF transition duration in a communication system.

Referring to FIG. 11A, an offset O1 between a starting point of the RF transition duration and an ending point of the PDCCH in the first bandwidth part may be defined. The base station may inform the terminal of the offset O1. The RF transition duration may be composed of N1 consecutive symbols, and the offset O1 may be composed of N2 consecutive symbols. Each of N1 and N2 may be a natural number.

Referring to FIG. 11B, an offset O2 between an ending point of the RF transition duration and a starting point of the data channel in the second bandwidth part may be defined. The base station may inform the terminal of the offset O2. The RF transition duration may be composed of N1 consecutive symbols, and the offset O2 may be composed of N3 consecutive symbols. Each of N1 and N3 may be a natural number.

Referring to FIG. 11C, when the PDCCH processing delay time T1 is defined, an offset O3 may be defined between the starting point of the RF transition duration and an ending point of the PDCCH processing delay time T1. The base station may inform the terminal of the offset O3. The RF transition duration may be composed of N1 consecutive symbols, and the offset O3 may be composed of N4 consecutive symbols. Each of N1 and N4 may be a natural number.

The base station may transmit configuration information of the RF transition duration for the bandwidth part switching to the terminal through signaling. For example, a higher layer signaling (e.g., RRC signaling, MAC signaling) or a physical layer signaling (e.g., DCI indicating switching of the bandwidth part) may be used for transmission of the configuration information of the RF transition duration. The length (e.g., N1) of the RF transition duration may be determined by T2 (i.e., the RF retuning time). The length of the RF transition duration may preferably be configured semi-statically by the higher layer signaling.

On the other hand, the offsets (e.g., O1, O2, O3) for indicating the location of the RF transition duration may be transmitted to the terminal through a higher layer signaling or a physical layer signaling. When the offsets (e.g., O1, O2, O3) are dynamically indicated by the physical layer signaling, an efficiency of time resource usage may be increased, but a signaling overhead may increase. Alternatively, the RF transition duration may be configured by a combination of the higher layer signaling and the physical layer signaling. For example, candidate value(s) of the configuration information (e.g., length, offset, numerology, etc.) of the RF transition duration may be preconfigured in the terminal by the higher layer signaling, and one of the candidate value(s) of the configuration information may be indicated dynamically by the physical layer signaling.

On the other hand, since the bandwidth part switching method may vary depending on the configuration of the bandwidth part, a plurality of T2 may be used. For example, when a change of an RF filter center is required for switching from the first bandwidth part to the second bandwidth part, a relatively large T2 may be used. On the other hand, when a change of an RF filter center is not required, a relatively small T2 may be used. When a plurality of T2 are used, a plurality of RF transition durations may be configured. In this case, the RF transition duration may be configured for each T2. Alternatively, the RF transition duration may be configured for each of the first bandwidth part, the second bandwidth part, and a combination of the first bandwidth part and the second bandwidth part. When the RF transition duration is configured for each T2, the terminal may perform the bandwidth part switching according to the RF transition duration corresponding to T2 after the T2 used for the bandwidth part switching is determined.

Meanwhile, a numerology of the first bandwidth part may be different from a numerology of the second bandwidth part. Each of the length and offsets (e.g., O1, O2, O3) of the RF transition duration may be defined based on the numerology of a predetermined bandwidth part among the first bandwidth part and the second bandwidth part. For example, when the RF transition duration is configured according to the embodiment of FIG. 11A or the embodiment of FIG. 11C, each of N1, N2, and N4 may be determined based on the numerology of the first bandwidth part (e.g., symbol length, subcarrier spacing).

Alternatively, when the RF transition duration is configured according to the embodiment of FIG. 11B, each of N1 and N3 may be determined based on the numerology of the second bandwidth part (e.g., symbol length, subcarrier spacing). Alternatively, the RF transition duration may be configured based on a smaller subcarrier spacing or a greater subcarrier spacing among a subcarrier spacing of the first bandwidth part and a subcarrier spacing of the second bandwidth part. Alternatively, the RF transition duration may be configured based on a reference numerology. The reference numerology may be configured regardless of the numerology of the first bandwidth part and the numerology of the second bandwidth part. The reference numerology may be included in the configuration information of the RF transition duration.

Determination of Dynamic Slot Format

The base station may dynamically inform the terminal of a slot format using a DCI. The base station may inform the terminal of candidate(s) of the slot formats that can be indicated by an SFI through RRC signaling. Then, the base station may transmit a DCI including an SFI indicating one of the candidate slot format(s) to the terminal. A set of slot format candidate(s) may be configured per cell or per carrier, and may be applied in common to all bandwidth parts within a cell. A subcarrier spacing (e.g., reference subcarrier spacing) used as a reference for interpreting the slot format candidate(s) may be configured in the terminal through RRC signaling and may be configured for each cell or each carrier. The same reference subcarrier spacing may be applied to all slot format candidate(s) configured by RRC signaling within a cell.

For example, the base station may configure 4 slot format candidates in the terminal via RRC signaling. Each of the 4 slot format candidates may be [DDDDDDDDDDDDDD], [DDDDDDDDDDXXUU], [DDDDDDDDXXUUUU], or [DDDDDXXUUUUUUU]. Each of the 4 slot format candidates may be a format for one slot. In the slot format candidate, 'D' may be a downlink symbol, 'X' may be an unknown symbol, and 'U' may be an uplink symbol. A reference subcarrier spacing (e.g., 15 kHz) of the SFI may be configured with 4 slot format candidates. In this case, the length of one slot may be 1 ms. The base station may transmit a DCI including an SFI indicating one of the 4 slot format candidates to the terminal. The terminal receiving the DCI may identify the slot format based on the SFI included in the DCI, and may apply the identified slot format to the slot in which the DCI is received.

On the other hand, a PDCCH monitoring occasion for receiving the SFI (e.g., the DCI including the SFI) of the terminal may be configured for each bandwidth part. Specifically, a DCI format used for transmission of the SFI may be transmitted through a PDCCH common search space, and a monitoring period of the PDCCH common search space for the transmission of the SFI may be configured for each downlink bandwidth part. The PDCCH monitoring occasion for receiving the SFI reception (hereinafter referred to as a 'SFI monitoring occasion') may be configured as follows.

Figure 12:
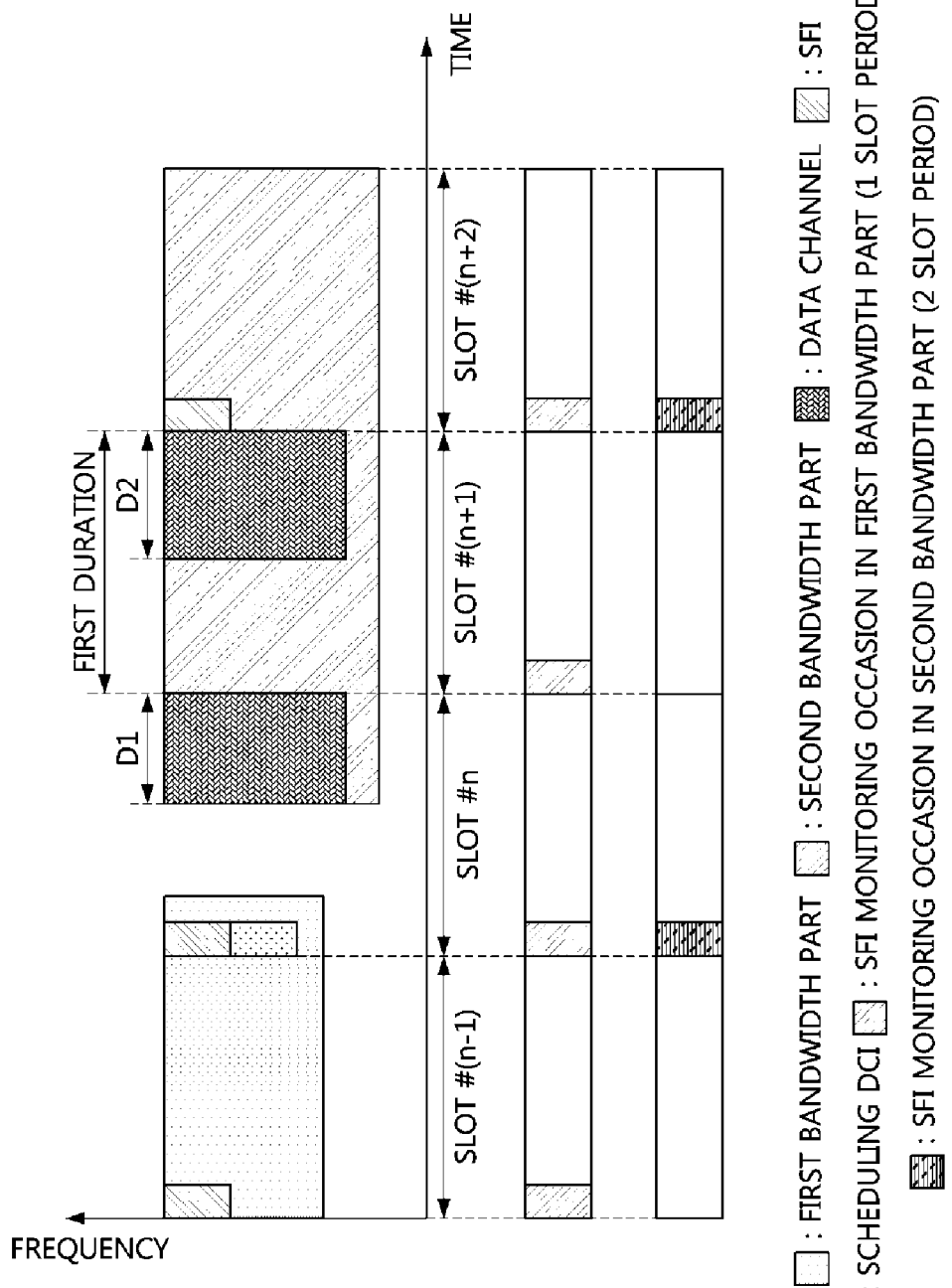
FIG. 12 is a conceptual diagram illustrating a first embodiment of an SFI monitoring occasion in a communication system.

FIG. 12 is a conceptual diagram illustrating a first embodiment of an SFI monitoring occasion in a communication system.

Referring to FIG. 12, in a first bandwidth part, an SFI monitoring occasion may be configured differently from an SFI monitoring occasion in a second bandwidth part. For example, a period of the SFI monitoring occasion in the first bandwidth part may be 1 slot, and a period of the SFI monitoring occasion in the second bandwidth part may be 2 slots. The base station may configure the period of the SFI monitoring occasion of each of the bandwidth parts to the terminal. In this case, an SFI received in the first bandwidth part may indicate a format for one slot, and an SFI received in the second bandwidth part may indicate formats for the 2 slots. Here, a numerology of the first bandwidth part may be assumed to be the same as a numerology of the second bandwidth part.

The terminal may be instructed to perform switching from the first bandwidth part to the second bandwidth part. When the terminal is instructed to switch from the first bandwidth part to the second bandwidth part, the terminal may receive a DCI through the first bandwidth part of a slot #n, and may identify scheduling information included in the DCI. The scheduling information may be scheduling information for a data channel (e.g., PDSCH or PUSCH) transmitted in the second bandwidth part. For example, a data channel may be scheduled by a DCI in each of the slots #n and #(n+1). That is, a data channel may be scheduled in D1 in the slot #n and a data channel may be scheduled in D2 in the slot #(n+1).

Before performing the switching operation of the bandwidth part, the terminal may successfully receive the SFI in the first bandwidth part of the slot #n. In this case, the SFI may be applied to not only the first bandwidth part but also the second bandwidth part of the slot #n. Thus, after switching from the first bandwidth part to the second bandwidth part, regardless of the sameness between the numerology of the first bandwidth part and the numerology of the second bandwidth part, the slot format indicated by the SFI received in the first bandwidth part of the slot #1 may be applied to the second bandwidth portion of the slot #n. When the numerology of the first bandwidth part differs from the numerology of the second bandwidth part, the terminal may convert the numerology by the method described with reference to FIG. 7 or the like so as to apply the slot format indicated by the SFI received in the first bandwidth part of the slot #n to the second bandwidth part of the slot #n.

However, in the present embodiment, there is no SFI monitoring occasion in which the SFI for the slot #(n+1) can be transmitted due to the bandwidth part switching. Therefore, it may be difficult for the terminal to acquire the dynamic slot format for the slot #(n+1) through the conventional method. In the following embodiments, terminal operations will be described in a duration (hereinafter referred to as a 'first duration') for which a slot format is not indicated by an SFI due to the bandwidth part switching.

When a semi-static slot format is configured in the terminal, the terminal may assume downlink transmission in a downlink duration and uplink transmission in an uplink duration based on the semi-static slot format. In this case, the terminal operation may be further defined in a duration configured as unknown by the semi-static slot format in the first duration. On the other hand, when the semi-static slot format is not configured in the terminal, the terminal may regard all the symbols constituting the first duration as unknown symbols. In this case, the terminal operation may be defined throughout the first duration. In the following embodiments, each of a 'semi-static unknown symbol' and a 'semi-static unknown duration' in the first duration may indicate symbols regarded as unknown symbols when a semi-static slot format is not configured in the terminal or a duration configured as an unknown duration by a semi-static slot format.

In Method 600, the terminal may not perform any operation in the semi-static unknown symbol of the first duration. The terminal may not transmit or receive a data channel (e.g., PDSCH or PUSCH), and may not perform a transmission or measurement operation of a reference signal in the semi-static unknown symbol of the first duration. In the embodiment of FIG. 12, when D2 is composed of semi-static unknown symbols, the terminal may not transmit or receive a data channel in D2. Also, the terminal may not expect a data channel to be scheduled in the first duration. Therefore, in the present embodiment, the terminal may transmit or receive a data channels only in D1.

In Method 601, the terminal may regard an SFI monitoring occasion as not configured in the first duration, and may perform the same operation as a case where the SFI monitoring occasion is not configured. That is, although the SFI monitoring occasion for the first bandwidth part and the second bandwidth part are configured, the terminal may regard the SFI monitoring occasion in the first duration as not configured. In the embodiment of FIG. 12, when D2 does not include semi-static uplink symbols, the terminal may receive a PDSCH in slot #(n+1). Alternatively, the terminal may monitor a PDCCH in the semi-static unknown symbol in the first duration. Alternatively, the terminal may perform transmission or reception of a semi-static or semi-persistent reference signal configured by a higher layer signaling in the semi-static unknown symbol in the first duration.

On the other hand, although the SFI monitoring occasion is configured in the terminal, the terminal may not receive an SFI in a specific SFI monitoring occasion (e.g., a PDCCH monitoring occasion in a specific slot). In Method 602, although an SFI monitoring occasion is not configured in the terminal in the first duration, the terminal may regard an SFI monitoring occasion as configured in the first duration, and may perform the same operation as in the case of not receiving the SFI even when the SFI monitoring occasion is configured. For example, the terminal may perform an operation according to Method 601 for a PDCCH monitoring or a data channel dynamically scheduled in the semi-static unknown symbol in the first duration. Alternatively, the terminal may not transmit a semi-static or semi-persistent reference signal configured by a higher layer signaling in the semi-static unknown symbol in the first duration.

In Method 603, the terminal may apply a format of a previous slot to the first duration. In the embodiment of FIG. 12, the terminal may apply the SFI received in the slot #n of the first bandwidth part to the slot #(n+1) (e.g., the first duration in the slot #(n+1)). That is, the terminal may repeatedly apply the SFI received in the first bandwidth part until the next SFI monitoring occasion in the second bandwidth part. When the SFI indicates a format for a plurality of slots, the corresponding SFI may be repeatedly applied in a wrap-around manner before the next SFI monitoring occasion.

In Method 604, the base station may generate an SFI (e.g., an SFI transmitted before switching of the bandwidth part) including configuration information of a slot format of the first duration, and transmit the generated SFI to the terminal. In the embodiment of FIG. 12, the terminal may identify the configuration information of the slot format of the first duration based on the SFI received in the slot #n of the first bandwidth part.

In Method 605, the base station may generate a DCI (e.g., DCI indicating switching of the bandwidth part) including configuration information of a slot format of the first duration, and transmit the generated DCI to the terminal. In the embodiment of FIG. 12, the terminal may identify the configuration information of the slot format of the first duration based on the DCI received in the slot #n of the first bandwidth part.

Alternatively, a two-step DCI may be used in Method 605. The terminal may obtain scheduling information of a data channel by receiving a first DCI and a second DCI. Here, the first DCI and the second DCI may be transmitted through a PDCCH search space. Alternatively, the first DCI may be transmitted through the PDCCH search space, and the second DCI may be transmitted through a part of a resource region in which the data channel is scheduled. In this case, the first DCI may include a bandwidth part indicator field.

When the switching of the bandwidth part is triggered by the first DCI, the second DCI may be transmitted in the switched bandwidth part (e.g., the second bandwidth part). In this case, the base station may transmit the second DCI including the configuration information of the slot format of the first section to the terminal. This method may be referred to as 'Method 606'. Since a payload size of the second DCI is not so large compared to a payload size of the first DCI, the configuration information of the slot format of the first duration may be included in the second DCI rather than the first DCI transmitted through the PDCCH search space. When the first duration occurs in the switching of the bandwidth part, the terminal may assume that the configuration information of the slot format of the first duration is included in the second DCI. Alternatively, the first DCI may include an indicator indicating whether the configuration information of the slot format of the first duration is included in the second DCI.

Even when any of the above-described methods is used, the terminal may determine whether or not a data channel scheduled by the DCI (e.g., the DCI including the bandwidth part indicator field) instructing to switch the bandwidth part is transmitted based on the same criterion as that of the conventional method. For example, when a transmission direction of a data channel does not collide with a transmission direction according to the semi-static slot format in the slot #(n+1) of FIG. 12, the terminal may transmit or receive the corresponding data channel.

Meanwhile, as another method for solving the above-described problem, the terminal may use a common SFI monitoring occasion and a common offset in all bandwidth parts in the same cell. This method may be referred to as 'Method 610'. The terminal may expect that a period and an offset (e.g., slot offset) of the PDCCH monitoring occasion for SFI reception are configured to be equal in all downlink bandwidth parts within the same cell. According to Method 610, the terminal can monitor an SFI at a specific point regardless of the active bandwidth part, so that a duration (e.g., the first duration) for which a slot format is not indicated may not occur.

Method 610 may be applied to bandwidth parts having the same subcarrier spacing. However, even when the bandwidth parts have different subcarrier spacings, monitoring periods and offsets of search spaces for the DCI format 2-0 may be appropriately adjusted, so that the periods and offsets of the SFI monitoring occasions of the terminal are configured to be the same in the bandwidth parts having different subcarrier spacings. For example, when downlink bandwidth parts having subcarrier spacings of 15 kHz and 30 kHz are configured in the terminal, the terminal may monitor an SFI in each S-th slot in the downlink bandwidth part having a subcarrier spacing of 15 kHz, and may monitor an SFI in each (2×S)-th slot in the downlink bandwidth part having a subcarrier spacing of 30 kHz. In this case, an absolute value of the period of the SFI monitoring occasion in the downlink bandwidth part having the subcarrier spacing of 15 kHz may be equal to an absolute value of the period of the SFI monitoring occasion in the downlink bandwidth part having the subcarrier spacing of 30 kHz. Method 610 may be applied to the embodiment of FIG. 13 described below.

Figure 13:
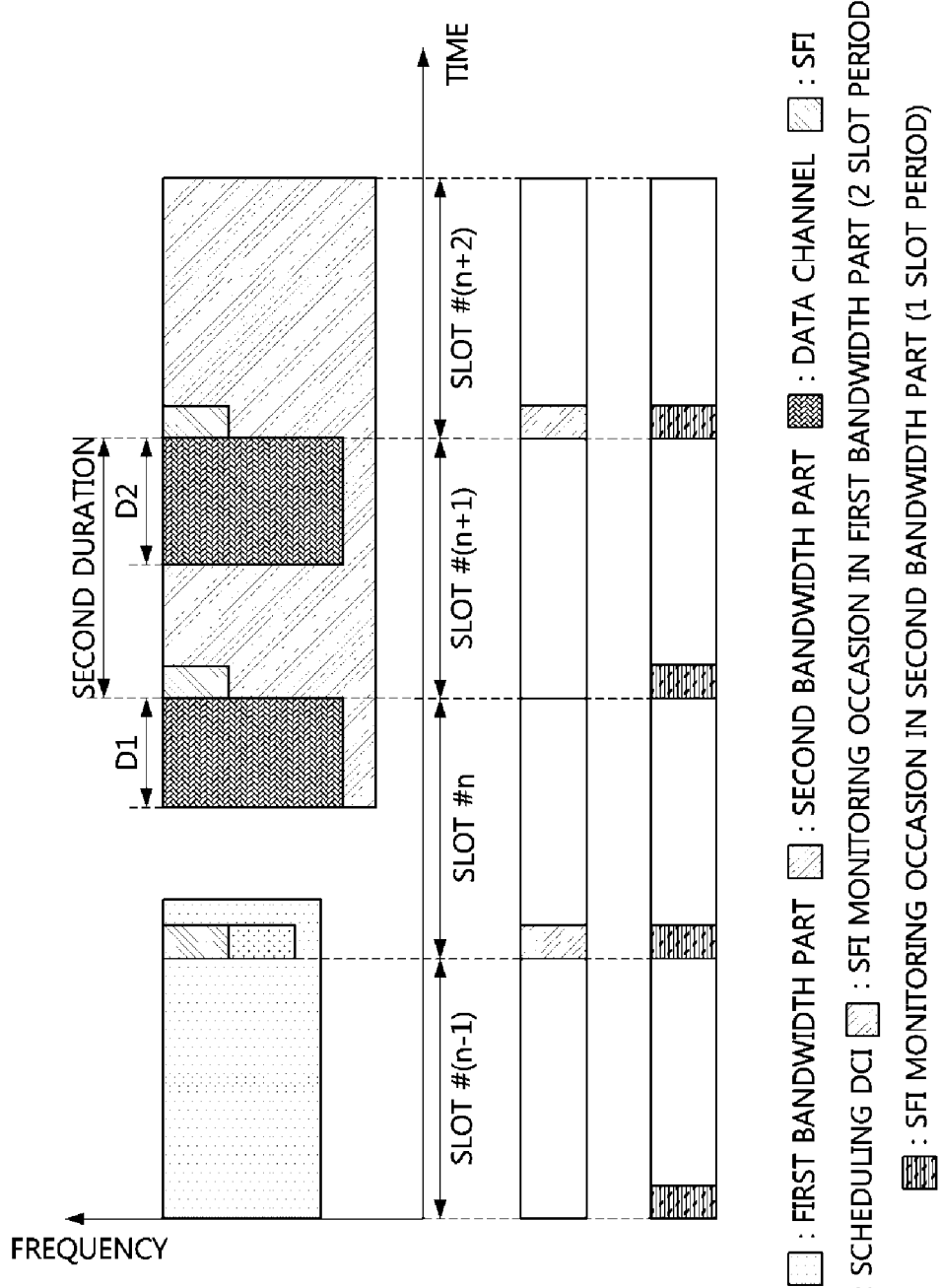
FIG. 13 is a conceptual diagram illustrating a second embodiment of an SFI monitoring occasion in a communication system.

FIG. 13 is a conceptual diagram illustrating a second embodiment of an SFI monitoring occasion in a communication system.

Referring to FIG. 13, in a first bandwidth part, an SFI monitoring occasion may be configured differently from an SFI monitoring occasion in a second bandwidth part. For example, a period of the SFI monitoring occasion in the first bandwidth part may be 2 slots, and a period of the SFI monitoring occasion in the second bandwidth part may be 1 slot. In this case, an SFI received by the terminal in the first bandwidth part may indicate the slot format for 2 slots, and an SFI received by the terminal in the second bandwidth part may indicate the slot format for 1 slot. Therefore, the terminal may receive a plurality of SFIs indicating the format of the slot #(n+1). For example, the terminal may identify the format of the slot #(n+1) based on the SFI (hereinafter referred to as a 'first SFI') received through the first bandwidth part in the slot #n, and identify the format of the slot #(n+1) based on the SFI (hereinafter referred to as a 'second SFI') received through the second bandwidth part in the slot #(n+1). A terminal operation may be defined in a duration for which a slot format is indicated by a plurality of SFIs (hereinafter referred to as a 'second duration').

When the SFI monitoring occasion is configured to the terminal as described above, the terminal may expect to receive one SFI indicating the slot format of the second duration. This method may be referred to as 'Method 620'. Therefore, the base station may transmit one SFI among the first SFI and the second SFI to the terminal. The format of the slot #n may not be indicated when the second SFI is transmitted instead of the first SFI. Therefore, the base station preferably transmits the first SFI instead of the second SFI. When the SFI is selectively transmitted, the base station may transmit the SFI in the bandwidth part whose period of the SFI monitoring occasion is relatively long. In this case, the terminal may expect to receive the SFI in the SFI monitoring occasion with a relatively long period among the SFI monitoring operations.

Alternatively, the terminal may expect to receive one or more SFIs indicating the slot format of the second duration. When the slot format of the second duration is indicated by a plurality of SFIs, the terminal may assume that the slot format indicated by the plurality of SFIs is the same. This method may be referred to as 'Method 621'. When Method 621 is used, the terminal may not perform a monitoring operation for reception of the second SFI when the first SFI is successfully received. However, if a false alarm of the first SFI occurs, it may be helpful for the terminal to perform a monitoring operation of the second SFI.

On the other hand, the base station may update the format of the slot #(n+1) through the SFI of the slot #(n+1) even when the SFI is transmitted in the slot #n. In this case, the terminal may expect to receive a plurality of SFIs for the second duration, and apply the latest SFI to the second duration when the plurality of SFIs are received. This method may be referred to as 'Method 622'. However, when the terminal successfully receives the first SFI but fails to receive the second SFI, the understanding of the base station and the terminal for the slot format of the second duration may be different.

Alternatively, the terminal may not apply the configuration of the dynamic slot format in a predetermined time duration when switching the bandwidth part. This method may be referred to as 'Method 630'. That is, the terminal may regard the predetermined time duration as a stabilization period according to the switching of the bandwidth part, and may not perform an operation that may cause ambiguity within the predetermined time duration. For example, the terminal may ignore SFIs received within the certain time duration. The length of the predetermined time duration to which the SFI is not applied may be predefined in the specification. Alternatively, the base station may configure the length of the predetermined time duration in the terminal. The location of the predetermined time duration may be derived from a reference time point. For example, the location of the predetermined time duration to which the SFI is not applied may be determined based on a reception point (e.g., symbol or slot) of the DCI indicating the switching of the bandwidth part or an activation point (e.g., symbol or slot) of the second bandwidth part. Method 630 may be used for operations other than the operations configuring the slot format. For example, Method 630 may be used to define terminal operations according to a preemption indicator (PI) described below.

Figure 14:
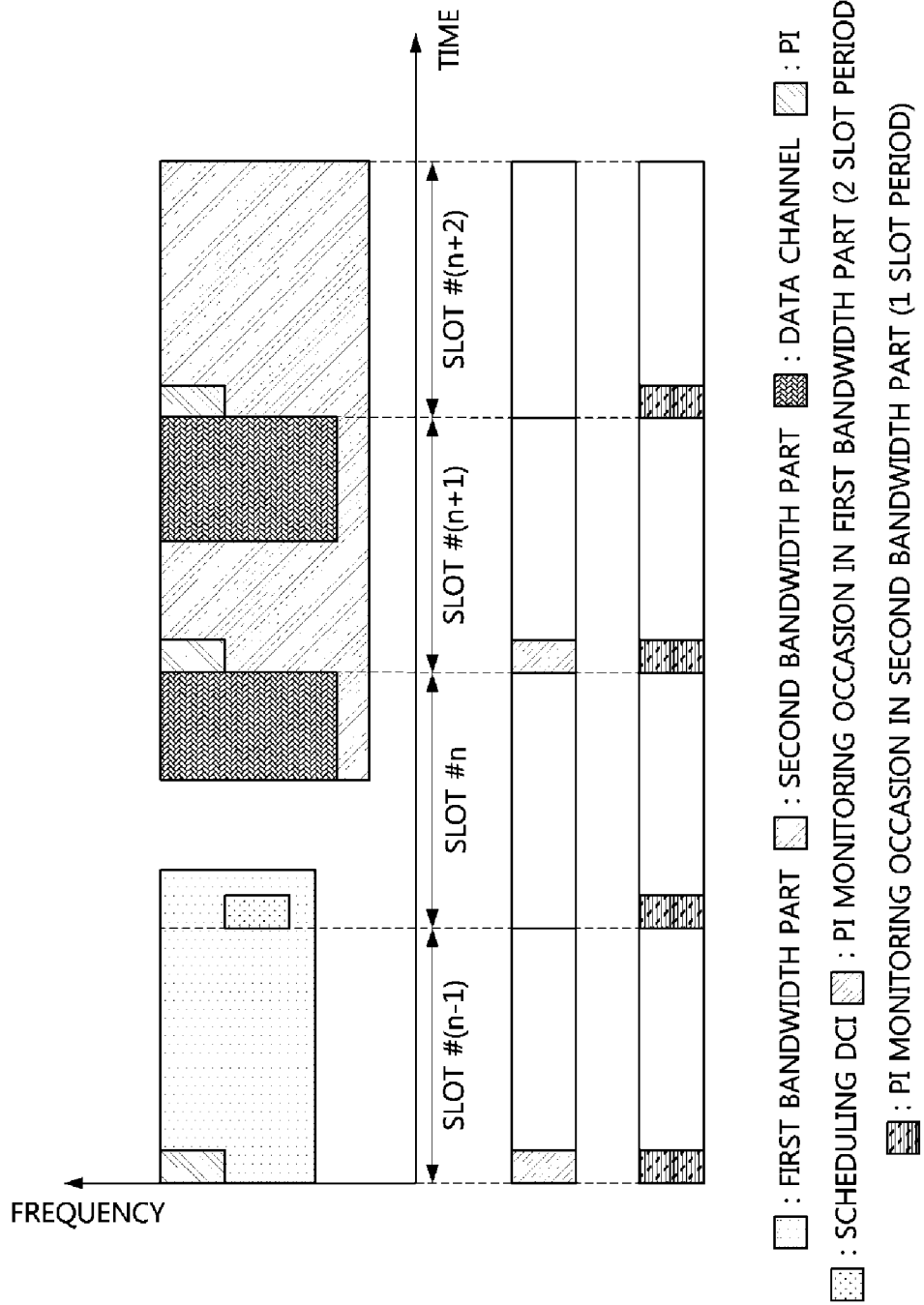
FIG. 14 is a conceptual diagram illustrating a first embodiment of a PI monitoring occasion in a communication system.

FIG. 14 is a conceptual diagram illustrating a first embodiment of a PI monitoring occasion in a communication system.

Referring to FIG. 14, a PDCCH monitoring occasion (hereinafter referred to as a 'PI monitoring occasion') for PI reception may be configured for each bandwidth part. Different PI monitoring occasions may be respectively configured in the terminal in the first bandwidth part and the second bandwidth part. For example, a period of the PI monitoring occasion in the first bandwidth part may be set to 2 slots, and a period of the PI monitoring occasion in the second bandwidth part may be set to 1 slot. A time duration for which the terminal applies the PI may be one PI monitoring occasion just before the reception of the PI. That is, the time duration for which the PI is applied may be from the first symbol in the PI monitoring occasion immediately before the reception of the PI to the previous symbol of the first symbol in the PI monitoring occasion in which the PI is received. The terminal may apply the PI received in the slot #(n−1) of the first bandwidth part to the slots #(n−3) and #(n−2), apply the PI received in the slot #(n+1) of the second bandwidth part to the slot #n, and apply the PI received in the slot #(n+2) of the second bandwidth part to the slot #(n+1).

The terminal may perform the switching operation of the bandwidth part according to the DCI received in the slot #n. In this case, the bandwidth part of the terminal may be switched from the first bandwidth part to the second bandwidth part. After the bandwidth part is switched, the terminal may receive the PI in the slot #(n+1). In this case, it may be necessary to define a time duration to which the PI received in the slot #(n+1) is applied. Since the PI is received in the second bandwidth part, the time duration to which the PI is applied may be determined based on the period of the PI monitoring occasion in the second bandwidth part. For example, the PI received in the slot #(n+1) may be applied to the slot #n. However, when a preemption occurs in the slot #(n−1), the base station may not inform the terminal that the preemption occurs in the slot #(n−1). To solve this problem, the PI received in slot #(n+1) may be applied to the slots #(n−1) and #n. In this case, the base station may inform the terminal that a preemption occurs in the slot #(n−1) using the PI transmitted in the slot #(n+1).

Timer-Based Bandwidth Switching

The terminal may receive the DCI in the first bandwidth part, and identify that switching from the first bandwidth part to the second bandwidth part is requested based on a bandwidth part indicator field of the DCI. When a timer-based bandwidth part switching method is not supported at the terminal, the terminal may operate in the second bandwidth part until receiving a DCI instructing to switch to a third bandwidth part other than when a fallback operation is required. Here, the first bandwidth part may be the third bandwidth part. On the other hand, when the timer-based bandwidth part switching method is supported by the terminal, the terminal may start a timer used for checking the activation time of the second bandwidth part, and when the timer expires, the terminal may perform a deactivation operation of the second bandwidth part and a switching operation to a default bandwidth part.

One of the bandwidth parts configured in the terminal may be configured as a default bandwidth part. When the default bandwidth part is not configured separately, an initial active bandwidth part may be used as the default bandwidth part. For example, when the initial active bandwidth part is the first bandwidth part, the first bandwidth part may be the default bandwidth part. The base station may configure the timer to the terminal. The configuration unit of the timer may be a millisecond or a slot. When the timer is set to 50 ms, the expiration time of the timer may be 50 ms, and then the timer may be initialized to 0 ms. Alternatively, when the timer is set to 50 ms, the expiration time of the timer may be 0 ms, and then the timer may be initialized to 50 ms.

When a DCI that schedules a data channel is received in the second bandwidth part, the terminal may extend the activation time of the second bandwidth part by initializing or extending the timer. The extension of the timer may mean that the timer is set to another value that is different from the initial value. In a FDD-based communication system, the timer may be independently applied to each of an uplink bandwidth part and a downlink bandwidth part. In a TDD-based communication system, the timer may be applied to a pair of an uplink bandwidth part and a downlink bandwidth part.

Meanwhile, the terminal may perform a random access procedure for various purposes. A terminal operating in the RRC connected state may also perform a contention-based or a contention-less random access procedure. For example, when there is no physical resource to transmit a scheduling request (SR) or a buffer status report (BSR), the terminal may perform the contention-based random access procedure by transmitting a PRACH to the base station.

When a PRACH resource is present in the active uplink bandwidth part and there is a search space for reception of Msg2 and/or Msg4 in the active downlink bandwidth part, the terminal may perform the random access procedure through the active bandwidth part. However, when there is no PRACH resource in the active uplink bandwidth part, the terminal may switch the active uplink bandwidth part to an uplink bandwidth part in which a PRACH resource is configured. When there is no search space for reception of Msg2 and/or Msg4 in the active downlink bandwidth part, the terminal switch the current active downlink bandwidth part to a downlink bandwidth part in which a search space for reception of Msg2 and/or Msg4 is configured. Alternatively, the terminal may expect that the PDCCH search space for reception of Msg2 and/or Msg4 is configured in all downlink bandwidth parts of the terminal. That is, the terminal may expect that all downlink bandwidth parts configured in the terminal are logically associated with a control resource set (CORESET) including a common search space for monitoring the DCI format 0-0.

It may happen that switching of the bandwidth part is required while the random access procedure is performed in the active bandwidth part. For example, a case where the timer-based bandwidth part switching is supported and the timer of the active bandwidth part expires after transmission of the PRACH may occur. In this case, the terminal may continue to perform the random access procedure in the bandwidth part in the PRACH is transmitted without switching to the default bandwidth part. This method may be referred to as 'Method 700'. Alternatively, the terminal may switch the current active bandwidth part to the default bandwidth part, and perform a random access procedure in the switched default bandwidth part (e.g., a random access procedure continued from the random access procedure performed in the active bandwidth part before switching, or a new random access procedure). This method may be referred to as 'Method 710'.

When Method 700 is used, a method of initializing or extending the timer for the active bandwidth part may be used. This method may be referred to as 'Method 701'. When Msg2, which is a response to the PRACH, is not received from the base station, the terminal may retransmit the PRACH through another beam or retransmit the PRACH using a higher transmission power. When a plurality of PRACHs are transmitted, the base station may receive the PRACH that the terminal last transmitted. In this case, the base station may not know the transmission order of the received PRACH (e.g., preamble) among the plurality of PRACHs transmitted from the PRACH.

In order to ensure that the base station and the terminal assume the same timer after the transmission and reception of Msg1 is completed, the terminal may initialize or extend the timer every time it transmits the PRACH. This method may be referred to as 'Method 702'. In Method 702, the base station may initialize or extend the timer when the PRACH is received. When a plurality of PRACHs are received from the terminal, the base station may initialize or extend the timer each time it receives the PRACH. The timer used in Method 701 may be configured in the terminal by the base station. Alternatively, a timer value used in Method 701 may be the same as the timer value applied to the switching operation of the bandwidth part.

In the TDD-based communication system, the method of managing the timer according to Method 701 may be applied to a pair of the uplink bandwidth part and the downlink bandwidth part. When an ID of the uplink bandwidth part is the same as an ID of the downlink bandwidth part, a common timer may be used in the uplink bandwidth part and the downlink bandwidth part. In the FDD-based communication system, the timer may be managed independently in each of the uplink bandwidth part and the downlink bandwidth part. Alternatively, the timer may only be used in the downlink bandwidth part. Therefore, in the FDD-based communication system, Method 701 may be applied to one of the uplink bandwidth part and the downlink bandwidth part. For protection of the Msg1 transmission procedure, Method 701 may be used only for the uplink bandwidth part. For example, the terminal that transmitted the PRACH may initialize or extend the timer of the uplink bandwidth part in which the PRACH is transmitted. When the timer is not used in the uplink bandwidth part, Method 701 may be applied to the downlink bandwidth part or the TDD-based communication system.

When the active bandwidth part is switched to the default bandwidth part during the execution of the Msg1 transmission procedure in Method 710, the terminal may perform an Msg1 transmission procedure (e.g., an Msg1 transmission procedure continued from the Msg1 transmission procedure performed in the active bandwidth part before switching or a 'new Msg1 transmission procedure') in the switched default bandwidth part. When the Msg1 transmission procedure continued from the Msg1 transmission procedure performed in the active bandwidth part before switching is performed, the terminal may proceed with the Msg1 transmission procedure without changing a power ramping counter and/or the beam change information after switching of the bandwidth part. According to this method, when the channel/beam environment and the PRACH resource configuration in the previous bandwidth part before switching are similar to the channel/beam environment and PRACH resource configuration in the switched default bandwidth portion, a time required for successfully transmitting Msg1 may be shortened. On the other hand, when the new Msg1 transmission procedure is performed, the terminal may initialize the power ramping counter and/or the beam change information, and perform the new Msg1 transmission procedure in the default bandwidth part. The two methods described above may be used for different environments. In this case, the base station may inform the terminal of the method used among the two methods.

Although Method 700, the detailed methods of Method 700, Method 710, and the detailed methods of Method 710 are described in the environment in which the timer-based bandwidth switching is supported, Method 700, the detailed methods of Method 700, Method 710, and the detailed methods of Method 710 may also be applied to the environment in which the timer-based bandwidth switching is not supported. During the execution of the random access procedure, it may happen that switching of the bandwidth part is required by the instruction of the DCI. In this case, Method 700, the detailed methods of Method 700, Method 710, and the detailed methods of Method 710 may be used.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a base station, the operation method comprising:
   transmitting, to a user equipment (UE), downlink control information (DCI) including scheduling information of a data channel in a search space;
   determining a reference point for mapping a demodulation reference signal (DMRS) of the data channel depending on a type of the search space in which the DCI is transmitted, the reference point being determined as a lowest-numbered subcarrier in a lowest-numbered common resource block (CRB) when the type of the search space is a UE-specific search space (USS), or the reference point being determined as a lowest-numbered subcarrier in an initial downlink bandwidth part (BWP) when the type of the search space is a specific common search space (CSS);
   mapping the DMRS of the data channel to resource elements (REs) which are determined based on the reference point; and
   transmitting, to the user equipment (UE), the data channel including the DMRS mapped to the REs based on the scheduling information included in the DCI.

2. The operation method of claim 1, wherein the DCI which is transmitted in the specific CSS is used for scheduling the data channel, the data channel including remaining minimum system information (RMSI).

3. The operation method of claim 1, wherein a cyclic redundancy check (CRC) of the DCI which is transmitted in the specific CSS is scrambled by a system information-radio network temporary identifier (SI-RNTI).

4. The operation method of claim 1, wherein the USS and the specific CSS are configured in a same BWP.

5. The operation method of claim 4, wherein the same BWP is the initial downlink BWP.

6. The operation method of claim 1, wherein a frequency location of the lowest-numbered subcarrier in the lowest-numbered CRB is configured to the UE.

7. The operation method of claim 6, wherein the frequency location of the lowest-numbered subcarrier in the lowest-numbered CRB is represented by a frequency offset from a location of a synchronization signal/physical broadcast channel (SS/PBCH) block.

8. The operation method of claim 1, wherein the lowest-numbered subcarrier in the lowest-numbered CRB is a subcarrier with an index 0 and the lowest-numbered CRB is a CRB with an index 0.

9. The operation method of claim 1, wherein the DCI is transmitted through a physical downlink control channel (PDCCH) and the data channel is a physical downlink shared channel (PDSCH).

10. An operation method of a user equipment (UE), the operation method comprising:
    receiving, from a base station, downlink control information (DCI) including scheduling information of a data channel in a search space;
    determining a reference point for mapping a demodulation reference signal (DMRS) of the data channel scheduled by the DCI depending on a type of the search space, the reference point being determined as a lowest-numbered subcarrier in a lowest-numbered common resource block (CRB) when the type of the search space is a UE-specific search space (USS), or the reference point being determined as a lowest-numbered subcarrier in an initial downlink bandwidth part (BWP) when the type of the search space is a specific common search space (CSS);

determining resource elements (REs) in which the DMRS is mapped based on the reference point; and receiving, from the base station, the data channel including the DMRS mapped to the REs based on the scheduling information included in the DCI.

11. The operation method of claim 10, wherein the DCI which is received in the specific CSS is used for scheduling the data channel including remaining minimum system information (RMSI).

12. The operation method of claim 10, wherein a cyclic redundancy check (CRC) of the DCI which is received in the specific CSS is scrambled by a system information-radio network temporary identifier (SI-RNTI).

13. The operation method of claim 10, wherein the USS and the specific CSS are configured in a same BWP.

14. The operation method of claim 13, wherein the same BWP is the initial downlink BWP.

15. The operation method of claim 10, wherein a frequency location of the lowest-numbered subcarrier in the lowest-numbered CRB is configured to the UE.

16. The operation method of claim 15, wherein the frequency location of the lowest-numbered subcarrier in the lowest-numbered CRB is represented by a frequency offset from a location of a synchronization signal/physical broadcast channel (SS/PBCH) block.

17. The operation method of claim 10, wherein the lowest-numbered subcarrier is a subcarrier in the lowest-numbered CRB with an index 0 and the lowest-numbered CRB is a CRB with an index 0.

18. The operation method of claim 10, wherein the DCI is received through a physical downlink control channel (PDCCH) and the data channel is a physical downlink shared channel (PDSCH).

* * * * *